(12) United States Patent
Banning

(10) Patent No.: US 7,645,875 B2
(45) Date of Patent: Jan. 12, 2010

(54) COLORANT COMPOUNDS

(75) Inventor: Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 218 days.

(21) Appl. No.: 11/641,137

(22) Filed: Dec. 19, 2006

(65) Prior Publication Data

US 2008/0146794 A1    Jun. 19, 2008

(51) Int. Cl.
C09B 47/04    (2006.01)
(52) U.S. Cl. .................................................. 540/140
(58) Field of Classification Search ................ 540/140
See application file for complete search history.

(56) References Cited

U.S. PATENT DOCUMENTS

| | | | |
|---|---|---|---|
| 3,653,932 A | 4/1972 | Berry et al. | |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,221,335 A | 6/1993 | Williams et al. | |
| 5,372,852 A | 12/1994 | Titterington et al. | |
| 5,496,879 A | 3/1996 | Griebel et al. | |
| 5,621,022 A | 4/1997 | Jaeger et al. | |
| 5,965,598 A * | 10/1999 | Roncucci et al. ............ | 514/410 |
| 6,034,236 A * | 3/2000 | Aoki et al. .................. | 540/143 |
| 6,472,523 B1 | 10/2002 | Banning et al. | |
| 6,476,219 B1 | 11/2002 | Duff et al. | |
| 6,726,755 B2 | 4/2004 | Titterington et al. | |

FOREIGN PATENT DOCUMENTS

| | | |
|---|---|---|
| EP | 0 206 286 B1 | 5/1990 |
| EP | 0 187 352 B1 | 6/1991 |
| WO | WO 94/04619 | 3/1994 |

OTHER PUBLICATIONS

Nazeeruddin et al. Efficient near-IR sensitization of nanocrystalline TiO2 films by zinc and aluminum phthalocyanines. 1999, Journal of Porphyrins and Phthalocyanines, 3, 230-237. (abstract included only).*
English abstract for DE4205636.
English abstract for DE4205713.
Copending U.S. Appl. No. 11/641,582, filed Dec. 19, 2006, entitled "Phase Change Inks," by Jeffrey H. Banning.

* cited by examiner

Primary Examiner—James O Wilson
Assistant Examiner—Brian McDowell
(74) Attorney, Agent, or Firm—Oliff & Berridge, PLC

(57) ABSTRACT

Disclosed is a compound of the formula

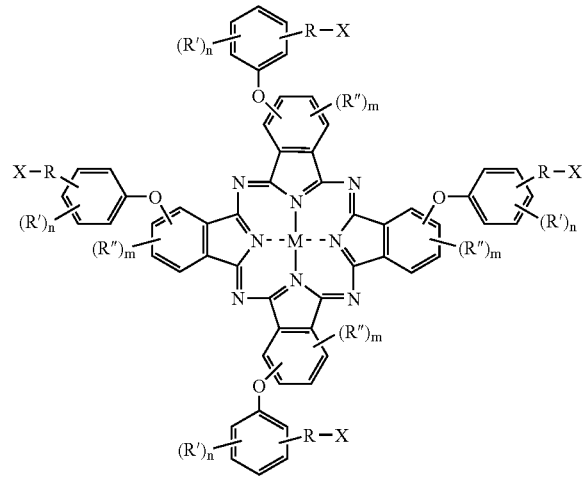

wherein M is atom or group of atoms capable of bonding to central cavity of phthalocyanine molecule, wherein axial ligands optionally can be attached to M, each R' is a substituent, each n is 0, 1, 2, 3, or 4, each R" is a substituent, each m is 0, 1, 2, or 3, each R is alkylene, arylene, arylalkylene, or alkylarylene, each X is —OH, —COOH, or

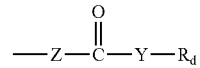

wherein each Y and each Z is a direct bond, oxygen, or —NR$_1$—, wherein R$_1$ is hydrogen, alkyl, aryl, arylalkyl, or alkylaryl, provided that Z and Y are not both direct bonds connected to a single C=O moiety at the same time, provided that when X is —COOH,

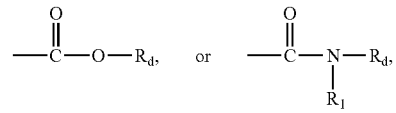

R can also be a direct bond, and each R$_d$ is alkyl, aryl, arylalkyl, or alkylaryl.

22 Claims, No Drawings

COLORANT COMPOUNDS

BACKGROUND

Disclosed herein are colorant compounds. More specifically, disclosed herein are phthalocyanine colorant compounds particularly suitable for use in hot melt or phase change inks. One embodiment is directed to a compound of the formula

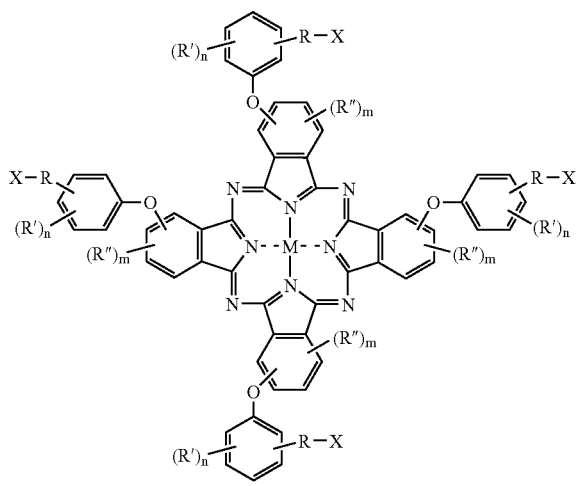

wherein M is an atom or group of atoms capable of bonding to the central cavity of a phthalocyanine molecule, wherein axial ligands optionally can be attached to M, each R', independently of the others, is a substituent, each n, independently of the others, is 0, 1, 2, 3, or 4, each R", independently of the others, is a substituent, each m, independently of the others, is 0, 1, 2, or 3, each R, independently of the others, is an alkylene group, an arylene group, an arylalkylene group, or an alkylarylene group, each X, independently of the others, is —OH, —COOH, or a group of the formula

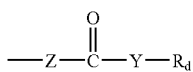

wherein each Y and each Z, independently of the others, is a direct bond, an oxygen atom, or a group of the formula —$NR_1$—, wherein $R_1$ is a hydrogen atom, an alkyl group, an aryl group, an arylalkyl group, or an alkylaryl group, provided that Z and Y are not both direct bonds connected to a single C=O moiety at the same time, provided that when X is —COOH,

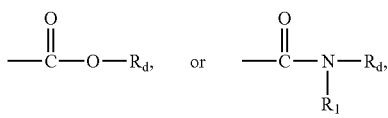

R can also be a direct bond, and each $R_d$, independently of the others, is an alkyl group, an aryl group, an arylalkyl group, or an alkylaryl group.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,472,523 (Banning et al.), U.S. Pat. No. 6,726,755 (Titterington et al.), and U.S. Pat. No. 6,476,219 (Duff et al.), the disclosures of each of which are incorporated herein by reference, disclose a compound of the formula

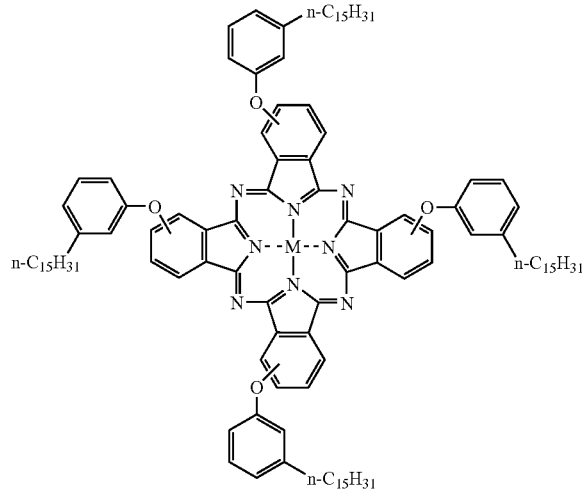

wherein M is an atom or group of atoms capable of bonding to the central cavity of a phthalocyanine molecule, wherein axial ligands optionally can be attached to M. U.S. Pat. No. 6,726,755 further discloses a phase change ink composition comprising a phase change ink carrier and this colorant compound. U.S. Pat. No. 6,476,219 further discloses methods for preparing these compounds.

While known compositions and processes are suitable for their intended purposes, a need remains for improved colorant compositions. In addition, a need remains for improved phthalocyanine compositions. Further, a need remains for colorants suitable for use in phase change inks. Additionally, a need remains for colorants that enable good to excellent lightfastness. There is also a need for improved colorants having improved cyan color for primary subtractive imaging. In addition, there is a need for improved colorants having high tinctorial power or spectral strength. Further, there is a need for improved cyan phase change ink colorants that are highly thermally stable in ink compositions for several weeks in air at temperatures exceeding 140° C. Additionally, there is a need for phase change ink colorants with low diffusion characteristic that will not bleed into inks containing other colorants. A need also remains for colorants with good to excellent lightfastness that are compatible with phase change ink vehicles. In addition, a need remains for colorants suitable for use in phase change inks that exhibit reduced or no variation in color over the life of the ink in the printer. Further, a need remains for colorants suitable for use in phase change inks that exhibit reduced or no variation in color subsequent to being deposited in imagewise fashion on substrates. Additionally, a need remains for colorants that have no carcinogenic or mutagenic effects. There is also a need for colorants that, when dissolved in phase change ink carriers, do not leave residues of material that might otherwise complicate filtration efficiency. In addition, there is a need for colorants that can be fine-tuned for compatibility with various phase change ink carriers. Further, there is a need for colorants that can be further derivatized to enable compatibility with phase change ink carriers.

SUMMARY

Disclosed herein is a compound of the formula

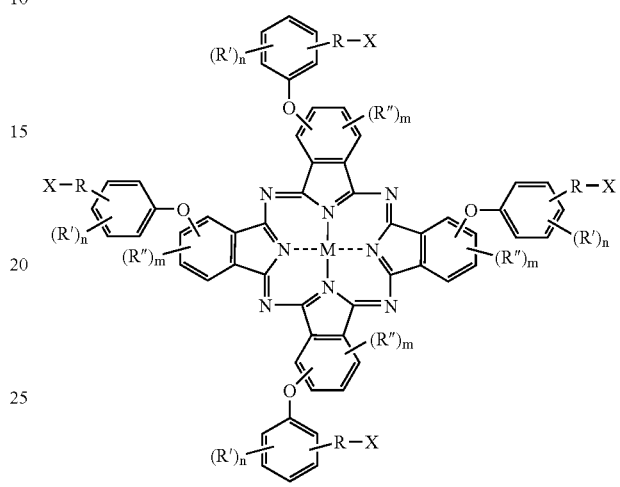

wherein M is an atom or group of atoms capable of bonding to the central cavity of a phthalocyanine molecule, wherein axial ligands optionally can be attached to M, each R', independently of the others, is a substituent, each n, independently of the others, is 0, 1, 2, 3, or 4, each R", independently of the others, is a substituent, each m, independently of the others, is 0, 1, 2, or 3, each R, independently of the others, is an alkylene group, an arylene group, an arylalkylene group, or an alkylarylene group, each X, independently of the others, is —OH, —COOH, or a group of the formula

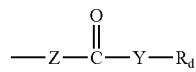

wherein each Y and each Z, independently of the others, is a direct bond, an oxygen atom, or a group of the formula —NR$_1$—, wherein R$_1$ is a hydrogen atom, an alkyl group, an aryl group, an arylalkyl group, or an alkylaryl group, provided that Z and Y are not both direct bonds connected to a single C=O moiety at the same time, provided that when X is —COOH,

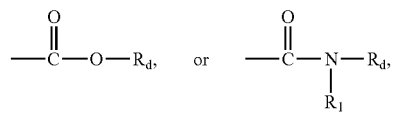

R can also be a direct bond, and each R$_d$, independently of the others, is an alkyl group, an aryl group, an arylalkyl group, or an alkylaryl group.

DETAILED DESCRIPTION

The colorant compounds disclosed herein are of the formula

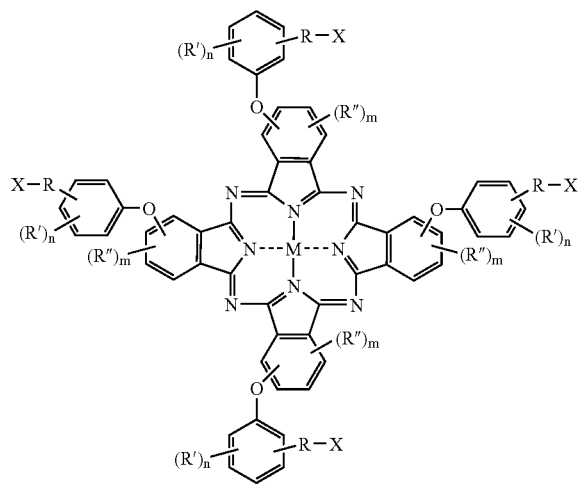

wherein M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference, including, but not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron(III), chlorotitanium(III), chlorochromium(III), chloroaluminum, chlorogallium, chloroindium, chlorophosphorus (III), dichlorotitanium(IV), dichlorosilicon, dichlorogermanium, dichlorotin, and the like, as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum (IV), oxo-vanadium(IV), oxo-titanium(IV), and the like; a divalent metal- or metalloidal-oxyhydrocarbon group, such as alkoxyaluminum, alkoxygallium, dialkoxy-silicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

Each R', independently of the others, is a substituent which can be (but is not limited to) (i) an alkyl group (including linear and branched, cyclic and acyclic, and saturated and unsaturated alkyl groups, and wherein the alkyl group can be either substituted or unsubstituted, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 100 carbon atoms, in another embodiment with no more than about 50 carbon atoms, and in yet another embodiment with no more than about 18 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 16 carbon atoms, and in yet another embodiment with no more than about 10 carbon atoms, although the number of carbon atoms can be outside of these ranges, (iii) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as benzyl or the like, (iv) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as tolyl or the like, (v) a nitrile group, (vi) a nitro group, (vii) an alkoxy group having from 1 to about 50 carbon atoms, or (viii) a substituent chosen from hydroxy groups, halogen atoms, amine groups, imine groups, ammonium groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, and combinations thereof, wherein two or more substituents can be joined together to form a ring. Each n, independently of the others, is 0, 1, 2, 3, or 4.

Each R", independently of the others, is a substituent which can be (but is not limited to) (i) an alkyl group (including linear and branched, cyclic and acyclic, and saturated and unsaturated alkyl groups, and wherein the alkyl group can be either substituted or unsubstituted, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 100 carbon atoms, in another embodiment with no more than about 50 carbon atoms, and in yet another embodiment with no more than about 18 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 16 carbon atoms, and in yet another embodiment with no more than about 10 carbon atoms, although the number of carbon atoms can be outside of these ranges, (iii) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as benzyl or the like, (iv) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as tolyl or the like, (v) a nitrile group, (vi) a nitro group, (vii) an alkoxy group having from 1 to about 50 carbon atoms, or (viii) a substituent chosen from hydroxy groups, halogen atoms, amine groups, imine groups, ammonium groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, and combinations thereof, wherein two or more substituents can be joined together to form a ring. Each m, independently of the others, is 0, 1, 2, or 3.

Each R, independently of the others, is (i) an alkylene group (including linear and branched, cyclic and acyclic, and saturated and unsaturated alkylene groups, and wherein the alkylene group can be either substituted or unsubstituted, and wherein hetero atoms, such as oxygen, nitrogen, sulfur, silicon, phosphorus, boron, and the like either may or may not be present in the alkylene group), in one embodiment with at least 1 carbon atom, and in one embodiment with no more than about 30 carbon atoms, in another embodiment with no more than about 25 carbon atoms, and in yet another embodiment with no more than about 18 carbon atoms, although the number of carbon atoms can be outside of these ranges, (ii) an arylene group (including substituted and unsubstituted arylene groups, and wherein hetero atoms, such as oxygen, nitrogen, sulfur, silicon, phosphorus, boron, and the like either may or may not be present in the arylene group) in one embodiment with at least about 5 carbon atoms, and in one embodiment with at least about 6 carbon atoms, and in one embodiment with no more than about 18 carbon atoms, and in another embodiment with no more than about 10 carbon atoms, although the number of carbon atoms can be outside of these ranges, an arylalkylene group (including substituted and unsubstituted arylalkylene groups, wherein the alkyl portion of the arylalkylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 30 carbon atoms, in another embodiment with no more than about 25 carbon atoms, and in yet another embodiment with no more than about 18 carbon atoms, although the number of carbon atoms can be outside of these ranges, or an alkylarylene group (including substituted and unsubstituted alkylarylene groups, wherein the alkyl portion of the alkylarylene group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 30 carbon atoms, in another embodiment with no more than about 25 carbon atoms, and in yet another embodiment with no more than about 18 carbon atoms, although the number of carbon atoms can be outside of these ranges.

Each X, independently of the others, is —OH, —COOH, or a group of the formula

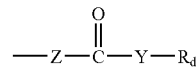

wherein each Y and each Z, independently of the others, is a direct bond, an oxygen atom, or a group of the formula —NR$_1$—, wherein R$_1$ is (i) a hydrogen atom, (ii) an alkyl group (including linear and branched, cyclic and acyclic, and saturated and unsaturated alkyl groups, and wherein the alkyl group can be either substituted or unsubstituted, and wherein hetero atoms, such as oxygen, nitrogen, sulfur, silicon, phosphorus, boron, and the like either may or may not be present in the alkyl group), in one embodiment with at least 1 carbon atom, and in one embodiment with no more than about 100 carbon atoms, in another embodiment with no more than about 50 carbon atoms, and in yet another embodiment with no more than about 18 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 20 carbon atoms, in another embodiment with no more than about 16 carbon atoms, and in yet another embodiment with no more than about 10 carbon atoms, although the number of carbon atoms can be outside of these ranges, (iv) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as benzyl or the like, or (v) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 18 carbon atoms, although the number of carbon atoms can be outside of these ranges, such as tolyl or the like, provided that Z and Y are not both direct bonds connected to a single C=O moiety at the same time; by this is meant that no set of Z and Y variables with in a single

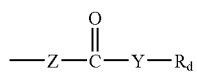

moiety should be selected so that the moiety results in

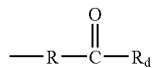

having direct bonds both between R and the carbonyl group and between the carbonyl group and $R_d$.

When X is —COOH,

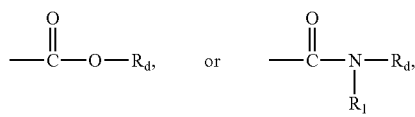

R can also be a direct bond (i.e., absent). In the latter two instances, Z is a direct bond and Y is not a direct bond.

Each $R_d$, independently of the others, is (i) an alkyl group (including linear and branched, cyclic and acyclic, and saturated and unsaturated alkyl groups, and wherein the alkyl group can be either substituted or unsubstituted, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 18 carbon atoms, and in yet another embodiment with at least about 48 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, in another embodiment with at least about 10 carbon atoms, and in yet another embodiment with at least about 14 carbon atoms, and in one embodiment with no more than about 30 carbon atoms, in another embodiment with no more than about 20 carbon atoms, and in yet another embodiment with no more than about 18 carbon atoms, although the number of carbon atoms can be outside of these ranges, (iii) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, in another embodiment with at least about 7 carbon atoms, and in yet another embodiment with at least about 18 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, in another embodiment with at least about 7 carbon atoms, and in yet another embodiment with at least about 18 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, such as tolyl or the like.

For all of the above groups, the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, the colorants described herein are of the formula
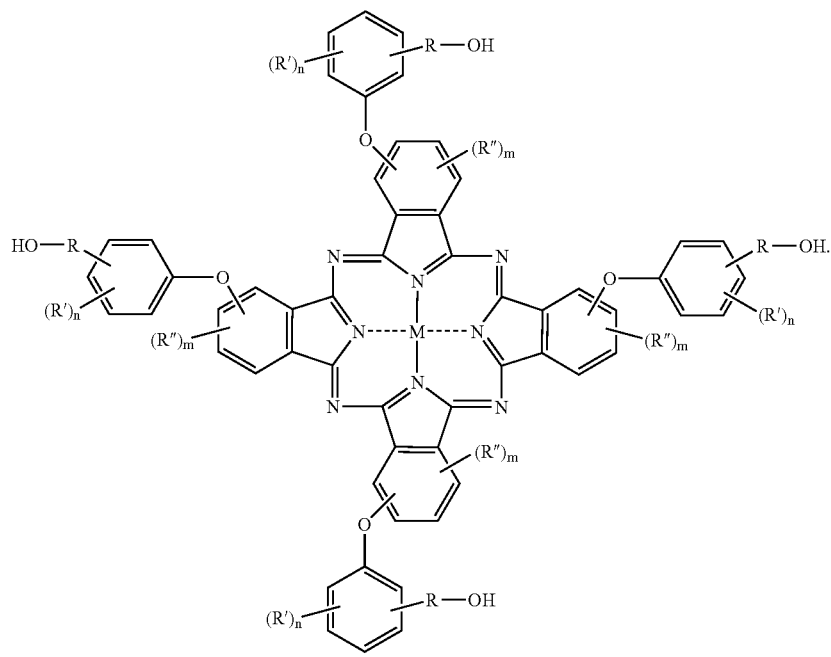
In another specific embodiment, the colorants described herein are of the formula
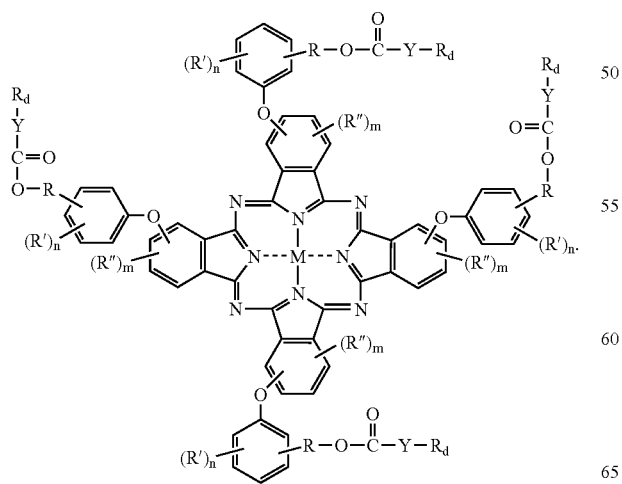

In yet another specific embodiment, the colorants described herein are of the formula
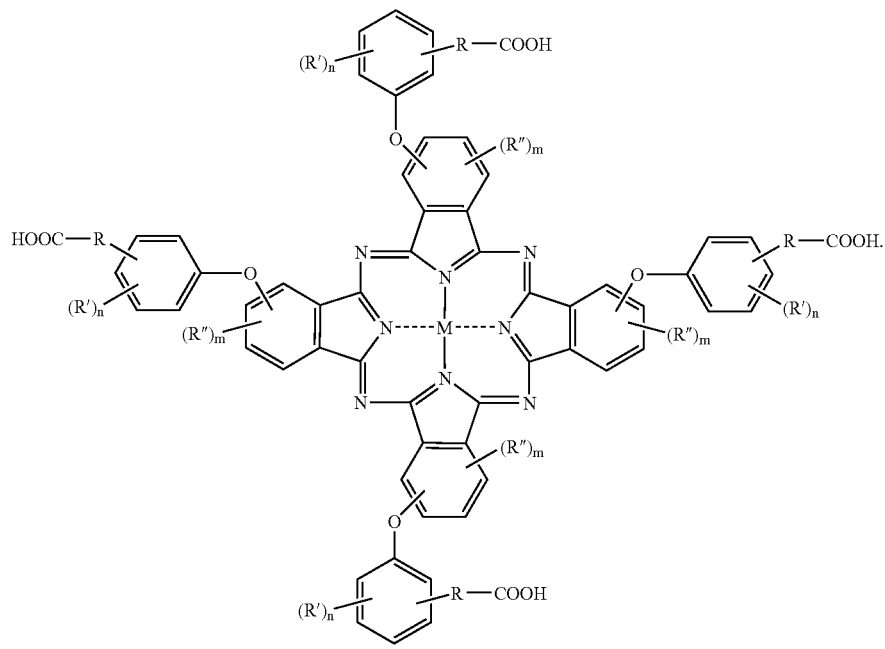
In still another specific embodiment, the colorants described herein are of the formula
In another specific embodiment, the colorants described herein are of the formula
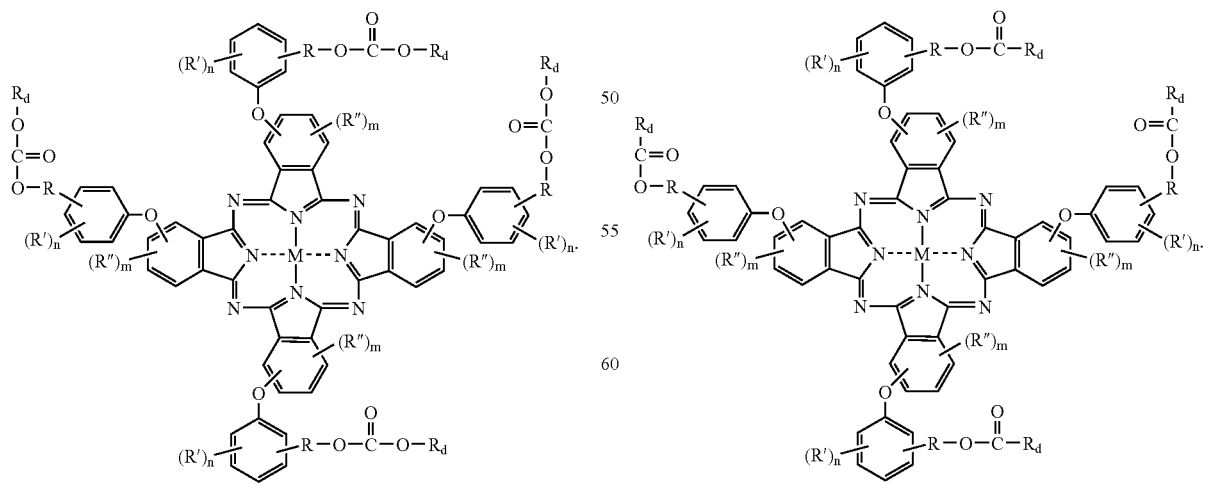

In yet another specific embodiment, the colorants described herein are of the formula
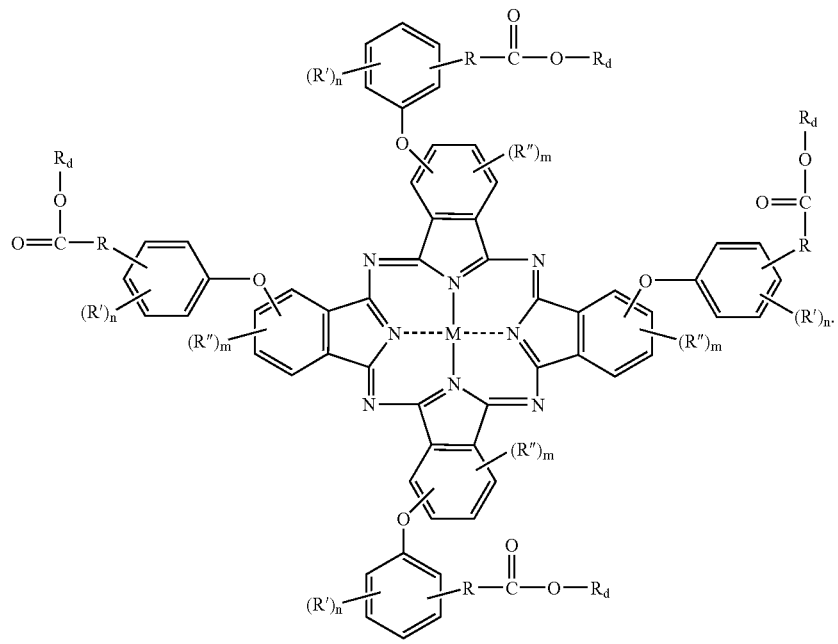
In still another specific embodiment, the colorants described herein are of the formula
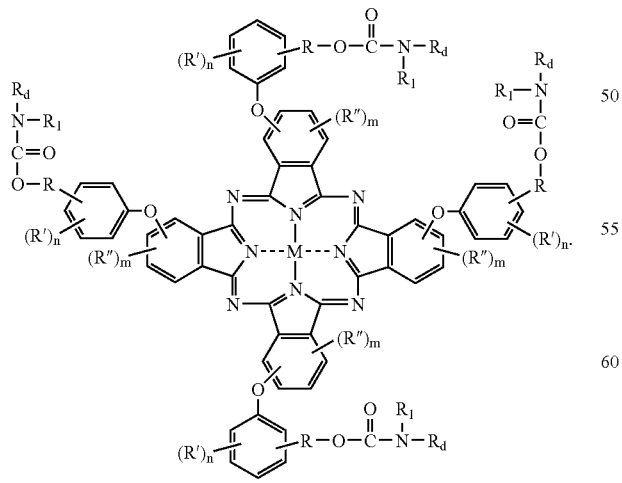

In another specific embodiment, the colorants described herein are of the formula
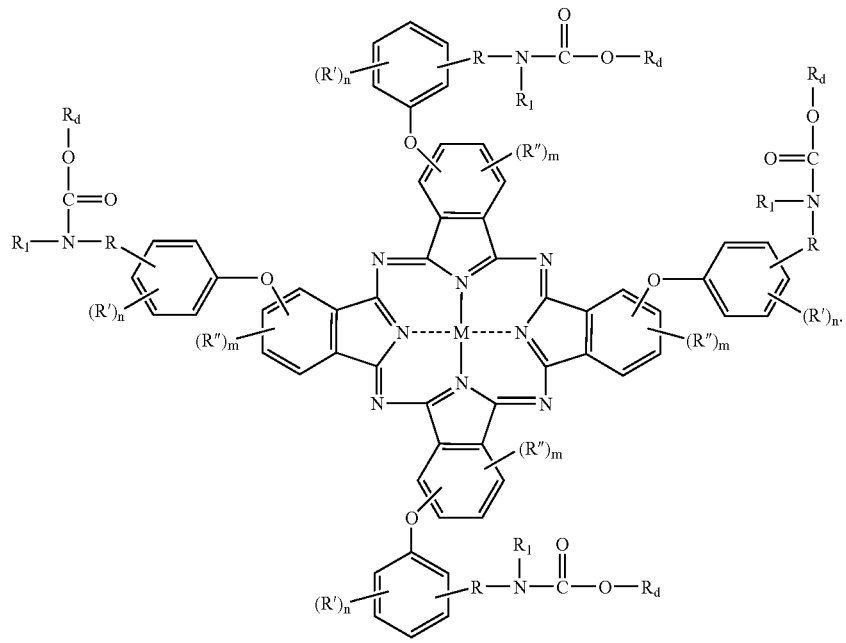
In yet another specific embodiment, the colorants described herein are of the formula
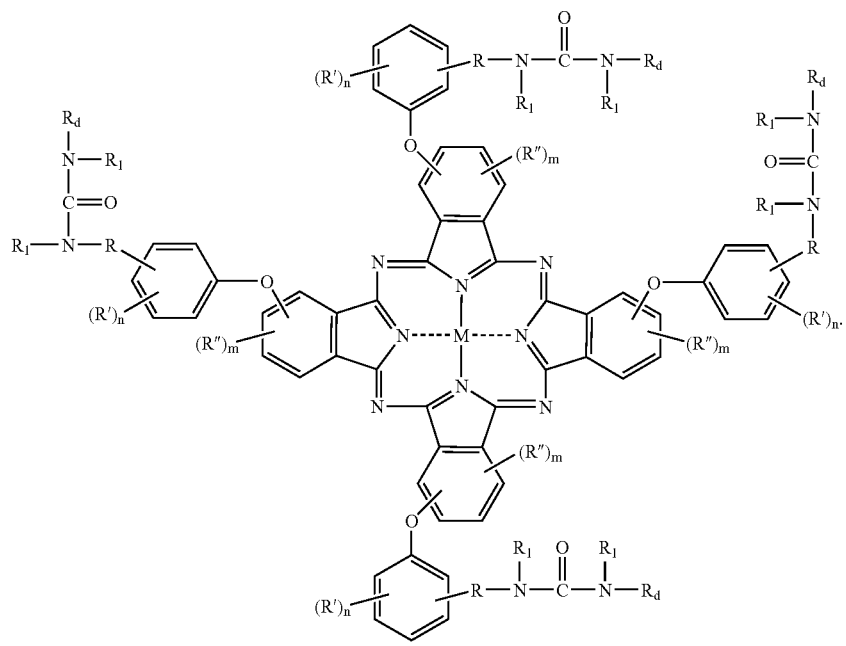

In still another specific embodiment, the colorants described herein are of the formula
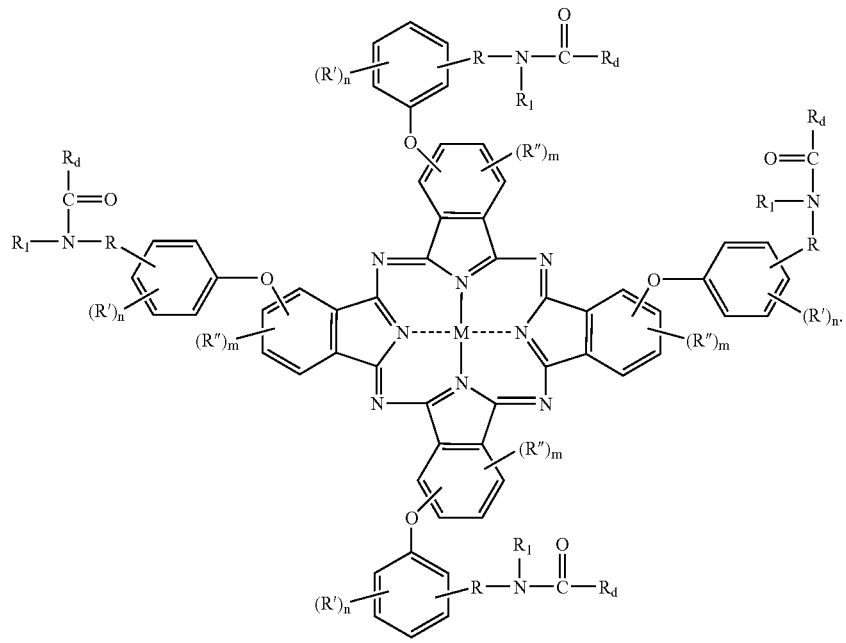
In another specific embodiment, the colorants described herein are of the formula
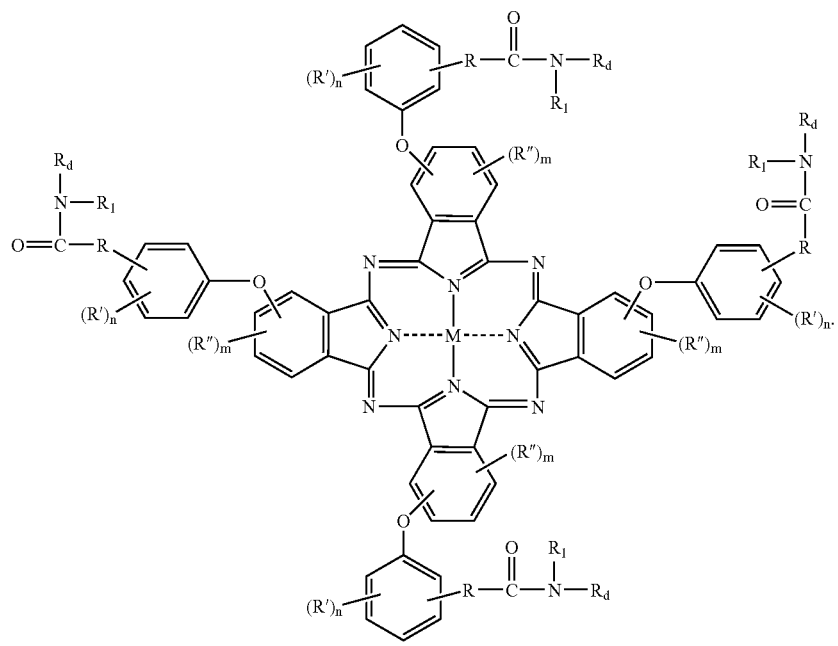

The colorant molecules disclosed herein can be prepared by any desired or effective process. In one embodiment, the process is carried out in two steps, the first of which is the synthesis of the alkylarylether adduct of phthalonitrile:

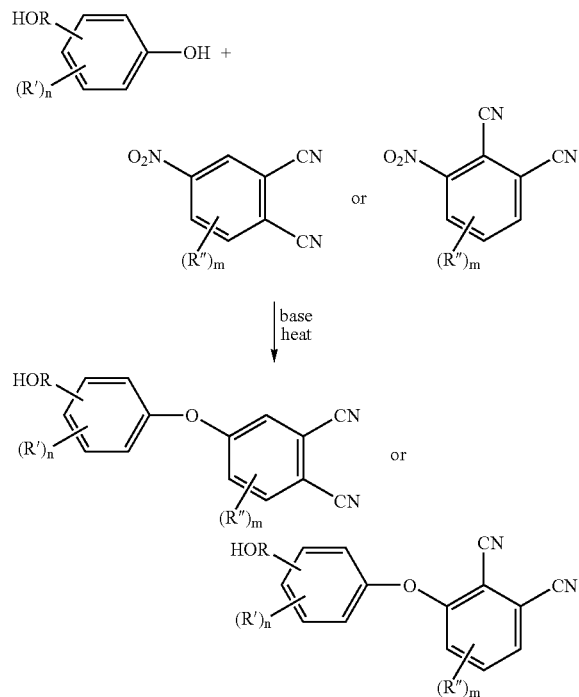

This process can be carried out by reacting the desired phenol with 3- or 4-nitrophthalonitrile in the presence of a base.

Suitable bases include both organic and inorganic bases. Examples of organic bases include (but are not limited to) trialkyl amines (including triethylamine, tripropylamine, tributylamine, and the like), piperidine, 1,4-diazabicyclo (2.2.2)octane, and the like, as well as mixtures thereof. Examples of inorganic bases include (but are not limited to) lithium hydroxide, sodium hydroxide, potassium hydroxide, lithium carbonate, sodium carbonate, potassium carbonate, lithium hydride, sodium hydride, potassium hydride, lithium alkoxide, sodium alkoxide, potassium alkoxide (wherein the alkoxide can be, but is not limited to, methoxide, ethoxide, propoxide, butoxide (including t-butoxide), and the like), and the like, as well as mixtures thereof.

The reactants are dissolved in any solvent capable of dissolving the reactants, such as methanol, ethanol, propanol, butanol, dioxane, acetone, toluene, nitrobenzene, dimethyl formamide, dimethyl sulfoxide, 1-methyl-2-pyrrolidinone, 1-cyclohexyl-2-pyrrolidinone, sulfolane, and the like, as well as mixtures thereof. The solids content of the reaction mixture in one embodiment is at least about 0.5 parts by weight solvent per every 1 part by weight phenol, and in another embodiment is at least about 2 parts by weight solvent per every 1 part by weight phenol, and in one embodiment is no more than about 20 parts by weight solvent per every 1 part by weight phenol, and in another embodiment is no more than about 6 parts by weight solvent per every 1 part by weight phenol, although the solids content can be outside of these ranges.

In one embodiment, the phenol and the base are added to the solvent, followed by heating the reaction mixture, in one embodiment to a temperature of at least about 30° C., and in another embodiment to a temperature of at least about 80° C., and in one embodiment to a temperature of no more than about 150° C., and in another embodiment to a temperature of no more than about 120° C., although the temperature can be outside of these ranges, for a period of time in one embodiment of at least about 0.25 hour, and in another embodiment of at least about 0.5 hour, and in one embodiment of no more than about 8 hours, and in another embodiment of no more than about 2 hours, although the time can be outside of these ranges. By allowing the phenol and the base to react first, the phenoxide salt is formed; optionally, the 3- or 4-nitrophthalonitrile can be added with the phenol and the base in a single step, in which case the preheating step is eliminated.

Thereafter, the 3- or 4-nitrophthalonitrile is added to the reaction mixture and the reaction mixture is then heated, in one embodiment to a temperature of at least about 30° C., and in another embodiment to a temperature of at least about 70° C., and in one embodiment to a temperature of no more than about 150° C., and in another embodiment to a temperature of no more than about 110° C., although the temperature can be outside of these ranges, for a period of time in one embodiment of at least about 0.25 hour, and in another embodiment of at least about 0.5 hour, and in one embodiment of no more than about 24 hours, and in another embodiment of no more than about 4 hours, although the time can be outside of these ranges.

Thereafter, the reaction mixture is cooled, in one embodiment to a temperature of at least about 20° C., and in one embodiment to a temperature of no more than about 100° C., and in another embodiment to a temperature of no more than about 60° C., although the temperature can be outside of these ranges, followed by quenching in a precipitant solvent, such as water, methanol, mixtures thereof, and the like, by stirring the reaction solution into the precipitant solvent or vice-versa, in an amount in one embodiment of at least about 0.25 part by weight precipitant solvent per every 1 part by weight reaction solution, and in another embodiment of at least about 0.5 part by weight precipitant solvent per every 1 part by weight reaction solution, and in one embodiment of no more than about 2 parts by weight precipitant solvent per every 1 part by weight reaction solution, and in another embodiment of no more than about 10 parts by weight precipitant solvent per every 1 part by weight reaction solution, although the relative amounts can be outside of these ranges, thereby causing precipitation of the alkylaryloxyphthalonitrile intermediate product, which can be isolated by filtration. Thereafter, the intermediate can be reslurried with water or dilute acid (for example, 2 percent wt/volume hydrochloric acid) or base (for example, 2 percent sodium hydroxide) and filtered, and then reslurried and filtered with pure water, and the process repeated until inorganic and/or organic salts are removed from the product and the filtrate is of neutral pH and has a conductivity of less than about 20 microSiemens.

If desired, the product can be further purified by slurrying it in a solvent, such as methanol, ethanol, propanol, isopropanol, acetone, N,N'-dimethylformamide, mixtures thereof, mixtures of one or more of these solvents with water, and the like, followed by isolation of the product by filtration, which process may remove minor organic contaminants from the alkylaryloxyphthalonitrile intermediate. Thereafter, the solid product can, if desired, be dried by heating under vacuum at a temperature in one embodiment of at least about 20° C., and in another embodiment of at least about 25° C., and in one embodiment of no more than about 10° C., and in another embodiment of no more than about 50° C., although the temperature can be outside of these ranges, for a period in one embodiment of at least about 1 hour, and in one embodiment of no more than about 72 hours, although the time can be outside of these ranges. Optionally, if desired, the product can be recrystallized by heating in a solvent, such as methanol, ethanol, isopropanol, and the like, cooling to about 0° C., and filtering and drying the crystals.

For the synthesis of the alkylarylether adduct of phthalonitrile, the molar ratio of phenol to 3- or 4-nitrophthalonitrile in one embodiment is at least about 1:1, and in one embodiment is no more than about 3:1, and in another embodiment is no more than about 1.5:1, although the molar ratio can be outside of these ranges, and the molar ratio of phenol to base in one embodiment is at least about 1:1, and in one embodiment is no more than about 3:1, and in another embodiment is no more than about 1:1 to about 1.5:1, although the molar ratio can be outside of these ranges.

In this embodiment, the second step in the synthesis of the colorant molecules entails conversion of the alkylarylether phthalonitrile adduct to the phthalocyanine:

zoate, and the like, an alkoxide, such as methoxide, ethoxide, isopropoxide, or the like, acetyl acetonate, a halide atom, such as fluoride, chloride, bromide, or iodide, sulfate, alkyl sulfonate, aryl sulfonate, nitrate, nitrite, phosphate, and the like, n is a number representing the valence of the metal, and y is an integer of from 0 to 10. Specific examples include (but are not limited to) anhydrous copper chloride, hydrated copper chloride, anhydrous copper acetate, hydrated copper acetate, anhydrous copper sulfate, hydrated copper sulfate, anhydrous copper nitrate, hydrated copper nitrate, anhydrous copper bromide, hydrated copper bromide, and the like, as well as mixtures thereof.

The alkylarylether phthalonitrile adduct, metal compound, and a solvent, such as ethylene glycol, amyl alcohol, hexanol,

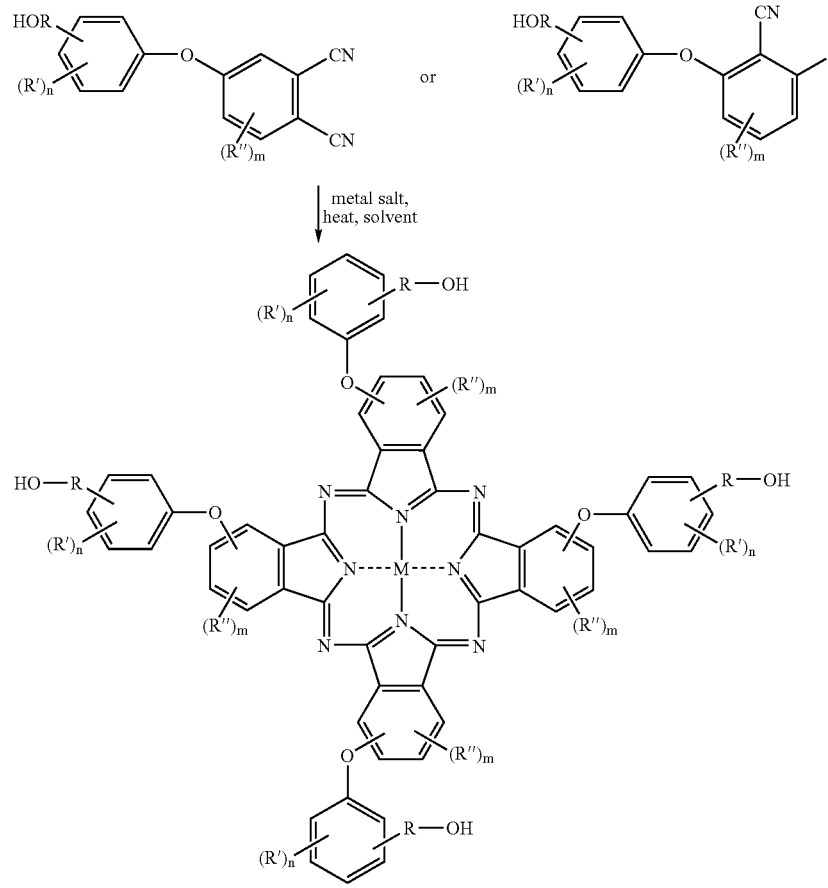

This process can be carried out by reacting the alkylarylether phthalonitrile adduct with a metal compound. Examples of suitable metal compounds include anhydrous and hydrated salts or complexes of the formula $$MX_n \cdot yH_2O$$

wherein M is a metal, such as lithium, sodium, potassium, beryllium, magnesium, calcium, scandium, titanium, zirconium, vanadium, niobium, chromium, molybdenum, manganese, rhenium, iron, ruthenium, cobalt, rhodium, nickel, palladium, platinum, copper, zinc, cadmium, aluminum, gallium, indium, silicon, germanium, tin, lead, and the like, X is an anion, such as a carboxylate-containing moiety, such as formate, acetate, acetoacetate, propionate, butyrate, benheptanol, tetralin, decalin, ISOPAR® (refined mineral spirits solvents available from Exxon), xylene, tributyl amine, N,N-dimethylaniline, quinoline, 1-chloronaphthalene, trialkanolamines, monoalkyl dialkanolamines, dialkyl monoalkanolamines (such as 2-dimethylaminoethanol, 2-diethylaminoethanol, 2-dimethylamino-1-propanol, and the like), dimethylsulfoxide, N,N-dimethylformamide, N,N-dimethylacetamide, 1-methyl-2-pyrrolidinone, N-cyclohexyl-2-pyrrolidinone, sulfolane, and the like, as well as mixtures thereof, are combined to form the reaction mixture. The solids content of the reaction mixture in one embodiment is at least about 3 parts by weight alkylarylether phthalonitrile adduct per every 100 parts by weight solvent, and in another embodiment is at least about 10 parts by weight alkylarylether phthalonitrile adduct per every 100 parts by weight solvent, and in one embodiment is no more than about 60 parts by weight alkylarylether phthalonitrile adduct per every 100 parts by weight solvent, and in another embodiment is no more than about 30 parts by weight alkylarylether phthalonitrile adduct per every 100 parts by weight solvent, although the solids content can be outside of these ranges.

The reaction mixture is heated to reflux. Reflux temperature in one embodiment is at least about 80° C., and in another embodiment is at least about 140° C., and in one embodiment is no more than about 250° C., and in another embodiment is no more than about 190° C., although the temperature can be outside of these ranges.

The reaction mixture is refluxed for a period of time in one embodiment of at least about 1 hour, and in another embodiment of at least about 2 hours, and in one embodiment of no more than about 24 hours, and in another embodiment of no more than about 8 hours, although the time can be outside of these ranges.

Thereafter, the reaction is cooled to a temperature in one embodiment of at least about 25° C., and in another embodiment of at least about 50° C., and in one embodiment of no more than about 150° C., and in another embodiment of no more than about 100° C., although the temperature can be outside of these ranges, filtered, typically through a filter of paper, glass fiber, polypropylene, GORETEX®, and the like, although other methods of filtration can also be used, and washed with a solvent, such as water, acetone, methyl ethyl ketone, methyl isobutyl ketone, methanol, ethanol, propanol, butanol, dimethyl formamide, dimethyl sulfoxide, N-methyl pyrrolidinone, sulfolone, and the like, as well as mixtures thereof. If desired, the precipitated blue solids can then again be filtered, slurried with a solvent, such as acetone, methyl ethyl ketone, methyl isobutyl ketone, methanol, ethanol, propanol, butanol, dimethyl formamide, dimethyl sulfoxide, N-methyl pyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, a catalyst or reaction promoter can also be included in the reaction mixture. Examples of suitable catalysts or reaction promoters include trialkanolamines, dialkyl monoalkanolamines, monoalkyl dialkanolamines, and the like, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples of suitable catalysts or reaction promoters including (but not limited to) 2-diethylaminoethanol, 2-dimethylaminoethanol, 2-dimethylamino-1-propanol, and the like, as well as mixtures thereof.

Suitable catalysts or reaction promoters also include ammonia-releasing compounds. Suitable ammonia-releasing compounds are any ammonium salts that release ammonia when heated, including (but not limited to) ammonium carbonate, ammonium carbamate, ammonium bicarbonate, ammonium molybdate, urea, ammonium salts of mono- and dicarboxylic acids, including (but not limited to) formic acid, acetic acid, propionic acid, butyric acid, benzoic acid, oxalic acid, malonic acid, and the like, as well as mixtures thereof. When an ammonia releasing compound is employed as a catalyst or reaction promoter, while not required, in a specific embodiment, the reaction of the alkylarylether phthalonitrile adduct with the copper salt takes place with a two stage temperature-warming profile. The first stage entails heating the reaction mixture to an intermediate temperature, in one embodiment of at least about 80° C., and in one embodiment of no more than about 140° C., although the temperature can be outside of these ranges, and for a period of time in one embodiment of at least about 0.25 hour, and in one embodiment of no more than about 3 hours, although the time can be outside of these ranges, during which time ammonia gas is slowly released. Thereafter, the reaction mixture is heated to a final temperature, in one embodiment of at least about 120° C., and in another embodiment of at least about 140° C., and in one embodiment of no more than about 250° C., and in another embodiment of no more than about 190° C., although the temperature can be outside of these ranges, and for a period of time in one embodiment of at least about 1 hour, and in another embodiment of at least about 2 hours, and in one embodiment of no more than about 24 hours, and in another embodiment of no more than about 10 hours, although the time can be outside of these ranges.

For the synthesis of the phthalocyanine compound, the molar ratio of phenoxy phthalonitrile adduct to metal compound in one embodiment is at least about 2:1, and in another embodiment is at least about 3:1, and in one embodiment is no more than about 10:1, and in another embodiment is no more than about 6:1, although the molar ratio can be outside of these ranges. When a catalyst or reaction promoter is used, the molar ratio of catalyst or reaction promoter to metal compound in one embodiment is at least about 0.1:1, and in another embodiment is at least about 0.5:1, and in one embodiment is no more than about 10:1, and in another embodiment is no more than about 2:1, although the molar ratio can be outside of these ranges.

In one specific embodiment, two or more catalysts or reaction promoters can be used, such as one or more from the class of alkanolamines and one or more from the class of ammonia-releasing compounds, two or more from the class of alkanolamines, two or more from the class of ammonia-releasing compounds, or the like.

Metal-free phthalocyanine can be prepared by treatment of an alkali metal phthalocyanine such as dilithium, disodium, dipotassium, beryllium, magnesium, or calcium phthalocyanine, prepared according to the above process, with a dilute aqueous or alcoholic acid. Examples of suitable acids include (but are not limited to) hydrochloric acid, phosphoric acid, sulfuric acid, nitric acid, sulfonic acids, such as alkylsulfonic, arylsulfonic, arylalkylsulfonic, and alkylarylsulfonic, wherein the alkyl portions thereof can be linear or branched, in one embodiment with from 1 to about 18 carbon atoms, although the number of carbon atoms can be outside of this range, and wherein the aryl portions thereof in one embodiment have from 6 to about 12 carbon atoms, although the number of carbon atoms can be outside of this range, carboxylic acids, such as alkylcarboxylic, arylcarboxylic, arylalkylcarboxylic, and alkylarylcarboxylic, wherein the alkyl portions thereof can be linear or branched, and wherein the carboxylic acid in one embodiment has from 1 to about 24 carbon atoms, although the number of carbon atoms can be outside of this range (such as formic, acetic, propionic, benzoic, and the like), and the like, as well as mixtures thereof. The acid is present in the water or alcohol solution in any desired or effective concentration, in one embodiment of at least about 1 percent by weight acid, and in another embodiment of at least about 2 percent by weight acid, and in one embodiment of no more than about 10 percent by weight acid, and in another embodiment of no more than about 5 percent by weight acid, although the acid concentration can be outside of these ranges. Examples of suitable alcohols include (but are not limited to) methanol, ethanol, propanol, isopropanol, ethylene glycol, and the like, as well as mixtures thereof.

Alternatively, the metal-free phthalocyanine dye can be prepared by heating a concentrated solution of phenoxyphthalonitrile in a dialkyl monoalkanolamine solvent, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples including 2-dimethylaminoethanol, 2-diethylaminoethanol, 2-dimethylamino-1-propanol, and the like, as well as mixtures thereof, in the presence of an ammonia-releasing compound.

The ratio by weight of phenoxyphthalonitrile to dialkyl monoalkanolamine solvent in one embodiment is at least about 10:80, and in another embodiment is at least about 25:75, and in one embodiment is no more than about 60:40, and in another embodiment is no more than about 50:50, although the relative amounts can be outside of these ranges.

Suitable ammonia-releasing compounds include those listed hereinabove with respect to catalysts or reaction promoters. The molar ratio of ammonia-releasing compound to phenoxyphthalonitrile in one embodiment is at least about 0.1 molar equivalent ammonia-releasing compound per every 1 molar equivalent of phenoxyphthalonitrile, and in another embodiment is at least about 0.5 molar equivalent ammonia-releasing compound per every 1 molar equivalent of phenoxyphthalonitrile, and in one embodiment is no more than about 5 molar equivalents ammonia-releasing compound per every 1 molar equivalent of phenoxyphthalonitrile, and in another embodiment is no more than about 2 molar equivalents ammonia-releasing compound per every 1 molar equivalent of phenoxyphthalonitrile, although the relative amounts can be outside of these ranges.

The mixture can be initially heated to a first temperature, in one embodiment of at least about 50° C., and in another embodiment of at least about 65° C., and in one embodiment of no more than about 130° C., and in another embodiment of no more than about 125° C., although the temperature can be outside of these ranges, for a period of time in one embodiment of at least about 10 minutes, and in another embodiment of at least about 20 minutes, and in one embodiment of no more than about 120 minutes, and in another embodiment of no more than about 60 minutes, although the time can be outside of these ranges, to promote slow release of ammonia, then is subsequently heated to a second temperature which is higher than the first temperature, in one embodiment of at least about 120° C., and in another embodiment of at least about 135° C., and in one embodiment of no more than about 200° C., and in another embodiment of no more than about 170° C., although the temperature can be outside of these ranges, for a period of time in one embodiment of at least about 1 hour, and in another embodiment of at least about 2 hours, and in one embodiment of no more than about 24 hours, and in another embodiment of no more than about 10 hours, although the time can be outside of these ranges.

Thereafter, the reaction mixture is cooled, in one embodiment to a temperature of at least about 25° C., and in another embodiment to a temperature of at least about 50° C., and in one embodiment to a temperature of no more than about 125° C., and in another embodiment to a temperature of no more than about 100° C., although the temperature can be outside of these ranges, and the product is separated by filtration or by decantation and washed with a solvent, such as water, acetone, methyl ethyl ketone, methyl isobutyl ketone, methanol, ethanol, propanol, butanol, dimethyl formamide, dimethyl sulfoxide, N-methyl pyrrolidinone, sulfolane, and the like, as well as mixtures thereof. If desired, the precipitated blue solids can then again be filtered, slurried with a solvent, such as acetone, methyl ethyl ketone, methyl isobutyl ketone, methanol, ethanol, propanol, butanol, dimethyl formamide, dimethyl sulfoxide, N-methyl pyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, the alkylarylether phthalonitrile adduct need not be isolated by addition of precipitant subsequent to its synthesis and prior to its reaction with the metal compound. In this embodiment, the reaction mixture in which the alkylarylether phthalonitrile adduct was formed can, if desired, optionally be filtered to remove any inorganic salts, followed by addition to the reaction mixture of the metal compound and, optionally, any desired reaction promoter. Thereafter, the reaction mixture is heated, to a temperature in one embodiment of at least about 120° C., and in another embodiment of at least about 140° C., and in one embodiment of no more than about 250° C., and in another embodiment of no more than about 190° C., although the temperature can be outside of these ranges, for a period of time in one embodiment of at least about 1 hour, and in another embodiment of at least about 2 hours, and in one embodiment for a period of time of no more than about 24 hours, and in another embodiment of no more than about 8 hours, although the time can be outside of these ranges. The phthalocyanine product thus formed can then be isolated as described hereinabove with respect to the two-step process.

The resulting product is of the formula

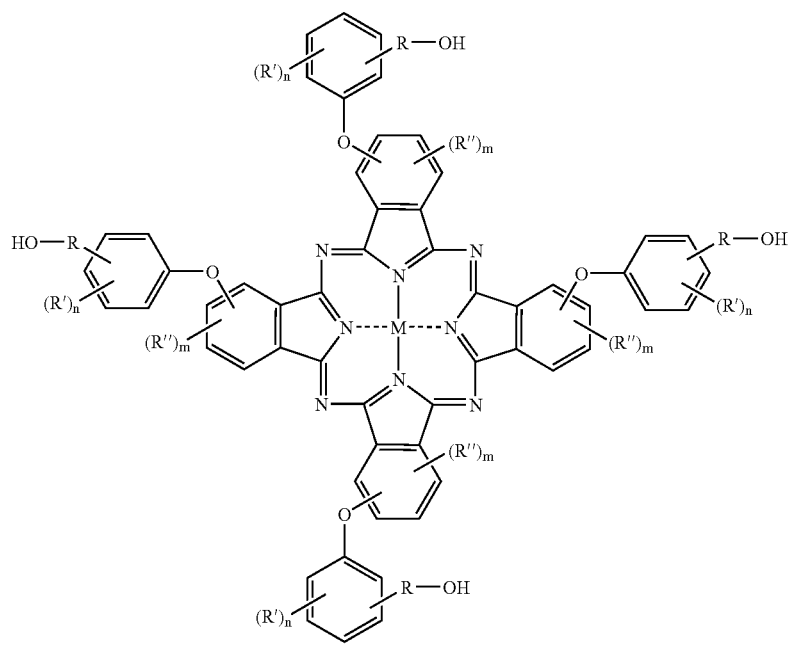

This product can be derivatized by any desired method to other colorant compounds described herein. For example, the —R—OH group can be converted to an ester group of the formula

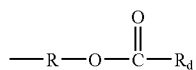

by reaction of the colorant with an anhydride of the formula

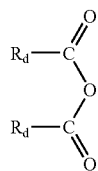

in the presence of a solvent.

The alcohol-substituted colorant and the anhydride are present in any desired or effective relative amounts, in one embodiment at least about 1 mole of anhydride per every one mole of alcohol-substituted colorant, and in one embodiment no more than about 1.1 moles of anhydride per every one mole of alcohol-substituted colorant, although the amount of anhydride can be outside of these ranges.

Examples of suitable solvents include acetic acid, propionic acid, formic acid, butyric acid, dimethyl formamide, dimethyl sulfoxide, hexamethyl phosphorus triamide (HMPA), tetrahydrofuran, or the like, as well as mixtures thereof. The solvent is present in any desired or effective amount, in one embodiment at least about 25 grams of alcohol-substituted colorant per every one liter of solvent, and in another embodiment at least about 100 grams of alcohol-substituted colorant per every one liter of solvent, and in one embodiment no more than about 200 grams of alcohol-substituted colorant per every one liter of solvent, although the amount of solvent can be outside of these ranges.

The reaction mixture containing the alcohol-substituted colorant, the solvent, and the anhydride is heated to any desirable or effective temperature, in one embodiment at least about 25° C., and in another embodiment at least about 40° C., and in one embodiment no more than about 100° C., and in another embodiment no more than about 60° C., although the temperature can be outside of these ranges.

The reaction mixture containing the alcohol-substituted colorant, the solvent, and the anhydride is heated for any desirable or effective period of time, in one embodiment at least about 2.5 hours, and in another embodiment at least about 3 hours, and in one embodiment no more than about 5 hours, although the heating time can be outside of these ranges. Reaction completion can be determined by thin layer chromatography of the reaction mixture to detect the presence of unreacted reactants.

The —R—OH group can be converted to a ester group of the formula

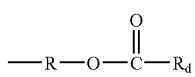

by reaction of the colorant with an esterification compound such as a carboxylic acid of the formula $R_dCOOH$ in the presence of a solvent and an optional esterification catalyst and heating the reaction mixture.

The alcohol-substituted colorant and the carboxylic acid are present in any desired or effective relative amounts, in one embodiment at least about 0.9 mole of carboxylic acid per every one mole of alcohol-substituted colorant, in another embodiment at least about 0.95 mole of carboxylic acid per mole of alcohol-substituted colorant, and in yet another embodiment at least about 1 mole of carboxylic acid per mole of alcohol-substituted colorant, and in one embodiment no more than about 2 moles of carboxylic acid per mole of alcohol-substituted colorant, in another embodiment no more than about 1.05 moles of carboxylic acid per mole of alcohol-substituted colorant, and in yet another embodiment no more than about 1 mole of carboxylic acid per mole of alcohol-substituted colorant, although the relative amounts of carboxylic acid and alcohol-substituted colorant can be outside of these ranges.

When the optional esterification catalyst is present, any desired or effective esterification catalyst can be used, such as para-toluene sulfonic acid, dibutyl tin dilaurate, or the like, as well as mixtures thereof. The esterification catalyst is present in any desired or effective amount, in one embodiment at least about 0.05 mole of esterification catalyst per every one mole of alcohol-substituted colorant, and in one embodiment no more than about 0.5 mole of esterification catalyst per mole of alcohol-substituted colorant, although the amount of esterification catalyst can be outside of these ranges.

Any desired or effective solvent can be used. Examples of suitable solvents include xylene, toluene, benzene, chlorobenzene, nitrobenzene, dichlorobenzene, and the like, as well as mixtures thereof. The reactants are present in the solvent in any desired or effective amount, in one embodiment at least about 25 grams of alcohol-substituted colorant per every one liter of solvent, in another embodiment at least about 50 grams of alcohol-substituted colorant per every one liter of solvent, and in yet another embodiment at least about 100 grams of alcohol-substituted colorant per every one liter of solvent, and in one embodiment no more than about 200 grams of alcohol-substituted colorant per every one liter of solvent, in another embodiment no more than about 150 grams of alcohol-substituted colorant per every one liter of solvent, and in yet another embodiment no more than about 100 grams of alcohol-substituted colorant per every one liter of solvent, although the amount of solvent can be outside of these ranges.

The reaction mixture containing the alcohol-substituted colorant, the carboxylic acid, the solvent, and the optional esterification catalyst is heated to any desirable or effective temperature, typically the reflux temperature of the selected solvent, in one embodiment at least about 100° C., and in one embodiment no more than about 130° C., although the temperature can be outside of these ranges.

The reaction mixture containing the alcohol-substituted colorant, the carboxylic acid, the solvent, and the optional esterification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The esterified colorant can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The —R—OH group can be converted to a urethane group of the formula

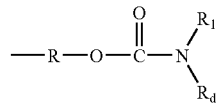

by reaction of the colorant with an isocyanate. Isocyanates react with alcohols to form urethanes. In the instant situation, the colorant is reacted with an isocyanate of the formula $R_d$—N=C=O.

Typically (although not necessarily), the reaction is carried out at elevated temperatures (for example, from about 60 to about 160° C.) in the presence of an optional urethane reaction catalyst, such as dibutyl tindilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol-substituted colorant typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules in the antioxidant-containing material, or the like.

The acid-substituted colorant can be prepared by methods analogous to the synthesis of the alcohol-substituted colorant, using as starting materials ortho-, meta-, or para-hydroxybenzoic acid or mixtures thereof, 2-, 3-, or 4-hydroxyphenylacetic acid or mixtures thereof, 3-(2-hydroxyphenyl)propionic acid, 3-(3-hydroxyphenyl)propionic acid, or 3-(4-hydroxyphenyl)propionic acid or mixtures thereof, or the like, and reacting them with 3- or 4-nitrophthalonitrile or mixtures thereof.

The —R—COOH group can be converted to an ester group of the formula

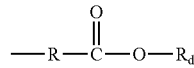

by admixing the acid-substituted colorant with an alcohol of the formula $R_d$—OH, an optional solvent, and an optional esterification catalyst and heating.

The acid-substituted colorant and the alcohol are present in any desired or effective relative amounts, in one embodiment at least about 1 mole of alcohol per every one mole of acid group, in another embodiment at least about 1.05 moles of alcohol per every one mole of acid group, and in yet another embodiment at least about 1.1 moles of alcohol per every one mole of acid group, and in one embodiment no more than about 2 moles of alcohol per every one mole of acid group, in another embodiment no more than about 1.5 moles of alcohol per every one mole of acid group, and in yet another embodiment no more than about 1.25 moles of alcohol per every one mole of acid group, although the relative amounts of acid-substituted colorant and alcohol can be outside of these ranges.

When the optional esterification catalyst is present, any desired or effective esterification catalyst can be used, such as para-toluene sulfonic acid, dibutyl tin dilaurate, or the like, as well as mixtures thereof. The esterification catalyst is present in any desired or effective amount, in one embodiment at least about 0.05 mole of esterification catalyst per every one mole of alcohol, and in one embodiment no more than about 0.5 mole of esterification catalyst per mole of alcohol, although the amount of esterification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of alcohol per every one liter of solvent, in another embodiment at least about 50 grams of alcohol per every one liter of solvent, and in yet another embodiment at least about 100 grams of alcohol per every one liter of solvent, and in one embodiment no more than about 200 grams of alcohol per every one liter of solvent, in another embodiment no more than about 150 grams of alcohol per every one liter of solvent, and in yet another embodiment no more than about 100 grams of alcohol per every one liter of solvent, although the amount of solvent can be outside of these ranges.

The reaction mixture containing the alcohol, the acid-substituted colorant, the optional solvent, and the optional esterification catalyst is heated to any desirable or effective temperature, typically the reflux temperature of the selected solvent, in one embodiment at least about 100° C., and in one embodiment no more than about 130° C., although the temperature can be outside of these ranges.

The reaction mixture containing the alcohol, the acid-substituted colorant, the optional solvent, and the optional esterification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The esterified colorant can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The —R—COOH group can be converted to an amide group of the formula

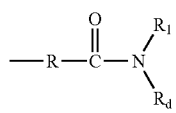

by admixing the acid-substituted colorant with a primary or secondary amine of the formula $NHR_1R_d$, an optional solvent, and an optional amidification catalyst and heating.

The acid-substituted colorant and the amine are present in any desired or effective relative amounts, in one embodiment at least about 1 mole of amine per every one mole of acid group, in another embodiment at least about 1.05 moles of amine per every one mole of acid group, and in yet another embodiment at least about 1.1 moles of amine per every one mole of acid group, and in one embodiment no more than about 2 moles of amine per every one mole of acid group, in another embodiment no more than about 1.5 moles of amine per every one mole of acid group, and in yet another embodiment no more than about 1.25 moles of amine per every one mole of acid group, although the relative amounts of acid-substituted colorant and amine can be outside of these ranges.

When the optional amidification catalyst is present, any desired or effective amidification catalyst can be used, such as phosphoric acid or the like. The amidification catalyst is present in any desired or effective amount, in one embodiment at least about 0.05 mole of amidification catalyst per every one mole of amine, and in one embodiment no more than about 0.5 mole of amidification catalyst per mole of amine, although the amount of amidification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of amine per every one liter of solvent, in another embodiment at least about 50 grams of amine per every one liter of solvent, and in yet another embodiment at least about 100 grams of amine per every one liter of solvent, and in one embodiment no more than about 200 grams of amine per every one liter of solvent, in another embodiment no more than about 150 grams of amine per every one liter of solvent, and in yet another embodiment no more than about 100 grams of amine per every one liter of solvent, although the amount of solvent can be outside of these ranges.

The reaction mixture containing the amine, the acid-substituted colorant, the optional solvent, and the optional amidification catalyst is heated to any desirable or effective temperature, typically the reflux temperature of the selected solvent, in one embodiment at least about 100° C., and in one embodiment no more than about 200° C., although the temperature can be outside of these ranges.

The reaction mixture containing the amine, the acid-substituted colorant, the optional solvent, and the optional amidification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The amidified colorant can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

A colorant having an amide group thereon, such as one of the formula

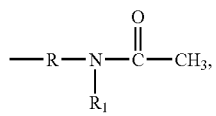

can be converted to a urea group of the formula

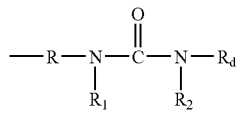

wherein $R_2$ has the same definition as $R_1$, by first hydrolyzing the amide by reaction with a base.

Any desired or suitable base can be employed, such as potassium hydroxide, sodium hydroxide, lithium hydroxide, calcium hydroxide, or the like, as well as mixtures thereof.

If desired, a solvent can be employed. Any desired or effective solvent can be employed, such as isopropanol, ethanol, butanol, other alcohols, or the like, as well as mixtures thereof.

The reactants are present in any desired or effective relative amounts, in one embodiment at least about 1 mole of base per every one mole of amide groups, in another embodiment at least about 3 moles of base per every one mole of amide groups, and in yet another embodiment at least about 5 moles of base per every one mole of amide groups, and in one embodiment no more than about 20 moles of base per every one mole of amide groups, in another embodiment no more than about 15 moles of base per every one mole of amide groups, and in yet another embodiment no more than about 10 moles of base per every one mole of amide groups, although the relative amounts can be outside of these ranges.

When a solvent is employed, the solvent and reactants are present in any desired or effective relative amounts, in one embodiment at least about 5 percent by weight reactant solids in the reaction mixture, and in another embodiment at least about 25 percent by weight reactant solids in the reaction mixture, and in one embodiment no more than about 50 percent by weight reactant solids in the reaction mixture, although the relative amounts can be outside of these ranges.

The reactants are allowed to react at any desired or effective temperature, in one embodiment the reflux or boiling temperature of the solvent, although the reaction temperature can be above or below this temperature if desired.

The reactants are allowed to react for any desired or effective period of time, in one embodiment at least about 6 hours, and in one embodiment no more than about 3 days, although the reaction time can be outside of these ranges.

The intermediate product thus prepared is then reacted with an isocyanate of the formula $R_d$—N═C═O. The reaction is allowed to continue until all of the isocyanate is consumed, which can be determined by IR spectra of the contents showing no absorbance corresponding to NCO peak at about 2230 cm$^{-1}$.

The —R—OH group can be converted to a carbonate group of the formula

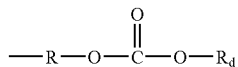

by reaction of the colorant with a $R_d$-haloformate, such as the corresponding chloroformate, or the like, optionally in the presence of a solvent.

Examples of suitable solvents include N-methylpyrrolidinone, dimethyl sulfoxide, sulfolane, and the like, as well as mixtures thereof. When a solvent is employed, the solvent and reactants are present in any desired or effective relative amounts, in one embodiment at least about 5 percent by weight reactant solids in the reaction mixture, and in another embodiment at least about 25 percent by weight reactant solids in the reaction mixture, and in one embodiment no more than about 50 percent by weight reactant solids in the reaction mixture, although the relative amounts can be outside of these ranges.

The reaction between the colorant and the haloformate can take place at any desired or effective temperature, in one embodiment at least about 100° C., and in one embodiment no more than about 150° C., although the temperatures can be outside of this range.

The reaction between the colorant and the haloformate can take place for any desired or effective amount of time, in one embodiment at least about 6 hours, and in one embodiment no more than about 2 days, although the time can be outside of this range.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I (p-Hydroxymethy-m-Methoxy Phenoxy)-4-Phthalonitrile Intermediate

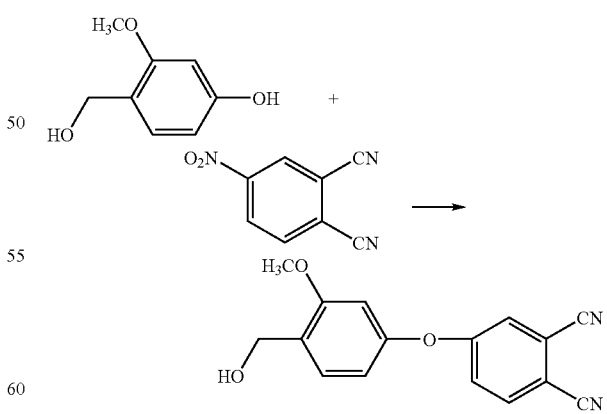

To a 500 milliliter round bottom flask equipped with magnetic stir and nitrogen inlet was charged 42.1 grams of 4-hydroxy-3-methoxybenzyl alcohol (MW=154), 33.5 grams of potassium carbonate (MW=138), and 330 grams of "dry" DMSO (in molecular sieve). The contents were heated in a 90° C. oil bath for about 1 hour. Thereafter, 41.9 grams of 4-nitrophthalonitrile (MW=173; obtained from TCI America, Portland, Oreg.) was added. The content were heated and stirred for 3 hours, after which a reverse phase TCL with methanol as the mobile phase was run which showed that no starting material remained in the reaction mixture (the Rfs were close). The contents were then poured into 1 liter of deionized water. The product precipitated out as a large chunk, which was filtered and collected. Infrared spectroscopy and TLC of the product indicated that none starting material, nitrophthalonitrile, remained. Then product was combined with methylene chloride and sonicated. Most of the solids dissolved. The mixture was then filtered and the filtrant was run through a silica plug. After the solvent was evaporated, about 59.3 grams of product was obtained.

EXAMPLE II

Intermediate

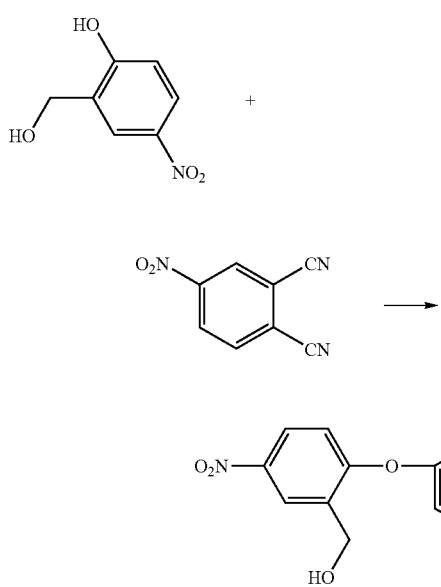

To a 100 milliliter one-neck round bottom flask equipped with magnetic stir bar, condenser, and silicone oil bath was charged 10.0 grams of 2-hydroxy-5-nitrobenzyl alcohol (MW=1 69), 8.0 grams of potassium carbonate (MW=138), and 80 grams of dry DMSO. The round bottom flask was placed in a 90° C. oil bath for one hour. Thereafter, 10.0 grams of 4-nitrophthalonitrile (MW=173) was added. The color of the contents turned from yellow to dark brown immediately. After 3 hours of stirring, TLCs were run on normal phase plates using toluene as the mobile phase, showing that none of the starting nitrophthalonitrile remained. The reaction mixture was then poured into 250 milliliters of de-ionized water, and a yellow-brown solid precipitated out. The solids were collected from filtration, dissolved in MIBK, and run through a silica plug. The final product was collected by distilling off the solvent.

EXAMPLE III

Intermediate

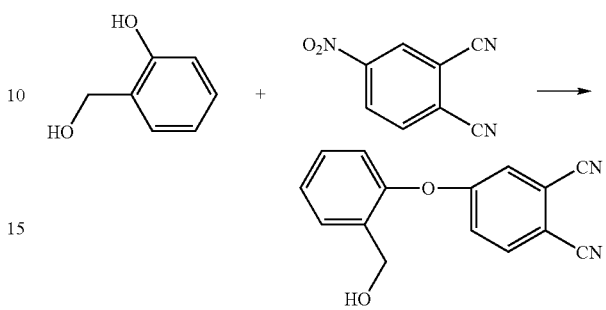

To a 500 milliliter one-neck round bottom flask equipped with magnetic stir bar, nitrogen inlet, and silicone oil bath was charged 25.0 grams of 2-hydroxybenzyl alcohol (MW=124), 27.0 grams of potassium carbonate (MW=138), and 160 grams of dry DMSO. The round bottom flask was placed in a 90° C. oil bath and heated/stirred for one hour. About 34.0 grams 4-nitrophthalonitrile were then added. The contents turned dark brown immediately. After 3 hours of additional heating/stirring, TLCs on normal phase plates using both toluene and 10% methanol/90% toluene as the mobile phase were performed, showing that none of the starting nitrophthalonitrile remained. The reaction mixture was poured into 300 milliliters of de-ionized water in a beaker. A tacky solid precipitated out. Water was subsequently decanted from the beaker. The remaining tacky product was dissolved in MIBK and run through a silica plug. The product was collected after the solvent was stripped off.

EXAMPLE IV

Intermediate

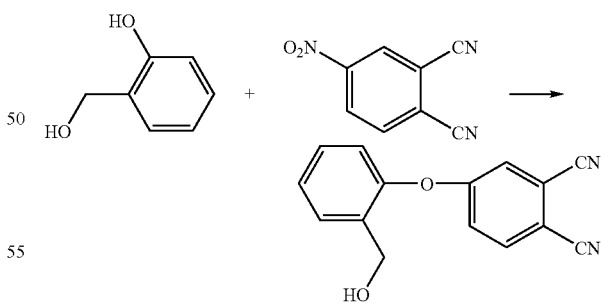

To a 500 milliliter one-neck round bottom flask equipped with magnetic stir bar, nitrogen inlet, and silicone oil bath was charged 50.0 grams of 2-hydroxybenzyl alcohol (MW=124), 55.6 grams of potassium carbonate (MW=138), and 310 grams of dry DMSO. The round bottom flask was placed in a 90° C. oil bath and heated/stirred for one hour. About 69.0 grams of 4-nitrophthalonitrile was then added. The contents turned dark brown immediately. After 3 hours of heating/stirring the contents of the reaction flask were poured into 800 milliliters of de-ionized water in a beaker. A tacky precipitate crashed out. The beaker was placed in a refrigerator to force as much precipitation as possible.

EXAMPLE V

Intermediate

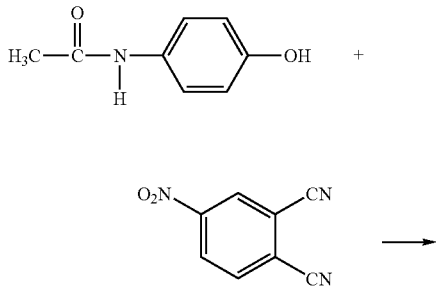

To a 250 milliliter one-necked round bottom flask equipped with magnetic stir bar, nitrogen inlet, and silicone oil bath is charged 10.0 grams of acetaminophen (MW=151), 9.1 grams of potassium carbonate (MW=138), and 100 grams of dry DMSO. The round bottom flask is placed in a 90° C. oil bath and heated/stirred for one hour. About 11.5 grams of 4-nitrophthalonitrile is then added. After 3 hours of heating/stirring, the contents of the reaction flask are poured into 800 milliliters of de-ionized water in a beaker to precipitate the product. The product is filtered, dried and collected for further use.

EXAMPLE VI

Intermediate

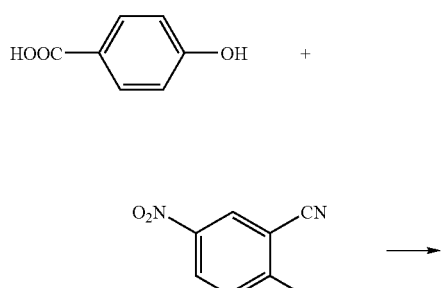

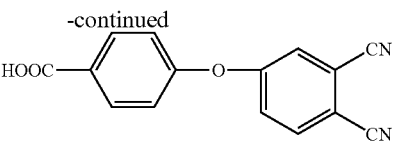

To a 250 milliliter one-necked round bottom flask equipped with magnetic stir bar, nitrogen inlet, and silicone oil bath is charged 9.2 grams of 4-hydroxybenzoic acid (MW=138), 9.1 grams of potassium carbonate (MW=138), and 100 grams of dry DMSO. The round bottom flask is placed in a 90° C. oil bath and heated/stirred for one hour. About 11.5 grams of 4-nitrophthalonitrile is then added. After 3 hours of heating/stirring, the contents of the reaction flask are poured into 800 milliliters of de-ionized water in a beaker to precipitate the product. The product is filtered, dried and collected for further use.

EXAMPLE VII (p-Hydroxymethy-m-Methoxy Phenoxy)-Substituted Copper Phthalocyanine

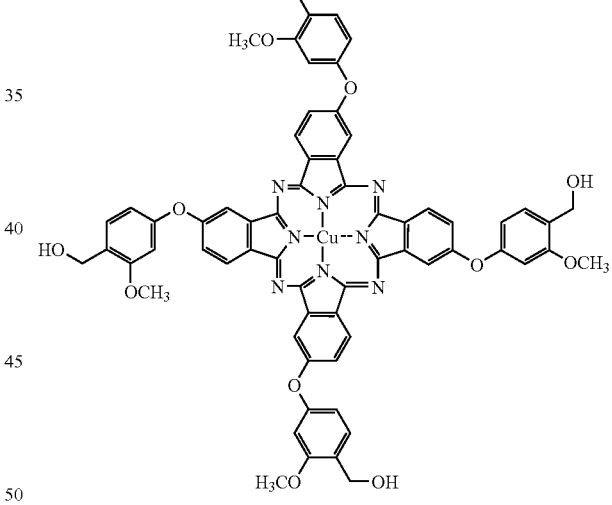

To a 500 milliliter one-neck round bottom flask equipped with magnetic stir bar, condenser, and silicone oil bath was charged 16.8 grams of the p-(hydroxymethyl)-m-methoxy phenoxy phthalonitrile prepared in Example I (MW=280), 9.2 grams of ammonia acetate (MW=77), 3.0 grams of copper acetate (MW=181), and 100 grams of N-methyl pyrrolidinone (NMP). The round bottom flask was placed in a 120° C. oil bath with stirring. After about half an hour the contents became brownish green. The temperature of the oil bath was then raised to 180° C. The color of the reaction mixture turned blue green. After being stirred at 180° C. for three hours the reaction mixture was poured into 300 grams of deionized water. The product precipitated out, was filtered, and dried. The product became tacky when it dried. Spectral strength was measured in NMP, e=21.83 L×A/g@683 nm.

EXAMPLE VIII

Esterified (p-Hydroxymethy-m-Methoxy Phenoxy)-Substituted Copper Phthalocyanine

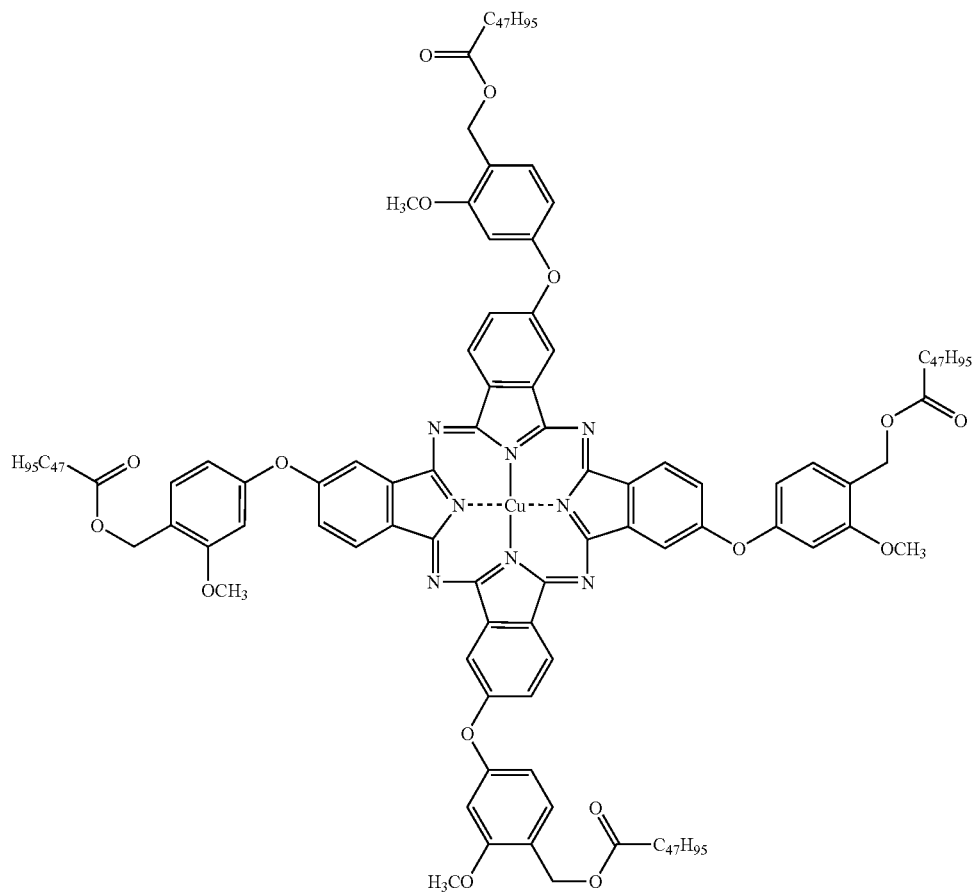

To a 500 milliliter one-neck round bottom flask equipped with magnetic stir bar, condenser, and silicone oil bath was charged 5.0 grams of the tetra(p-(hydroxymethyl)-m-methoxy phenoxy) phthalocyanine prepared in Example VII, 16.0 grams of UNICID® 700 (obtained from Baker Petrolite Corp., Tulsa, Okla.), a spatula tip of p-toluene sulfonic acid as a catalyst, and 150 grams of N-methyl pyrrolidinone. The contents were heated to 150° C. for about 24 hours, cooled, filtered, and washed with methanol. A waxy cyan colored solid dye was obtained.

EXAMPLE IX

Tetrastearyl Urethane (p-Hydroxymethy-m-Methoxy Phenoxy)-Substituted Copper Phthalocyanine

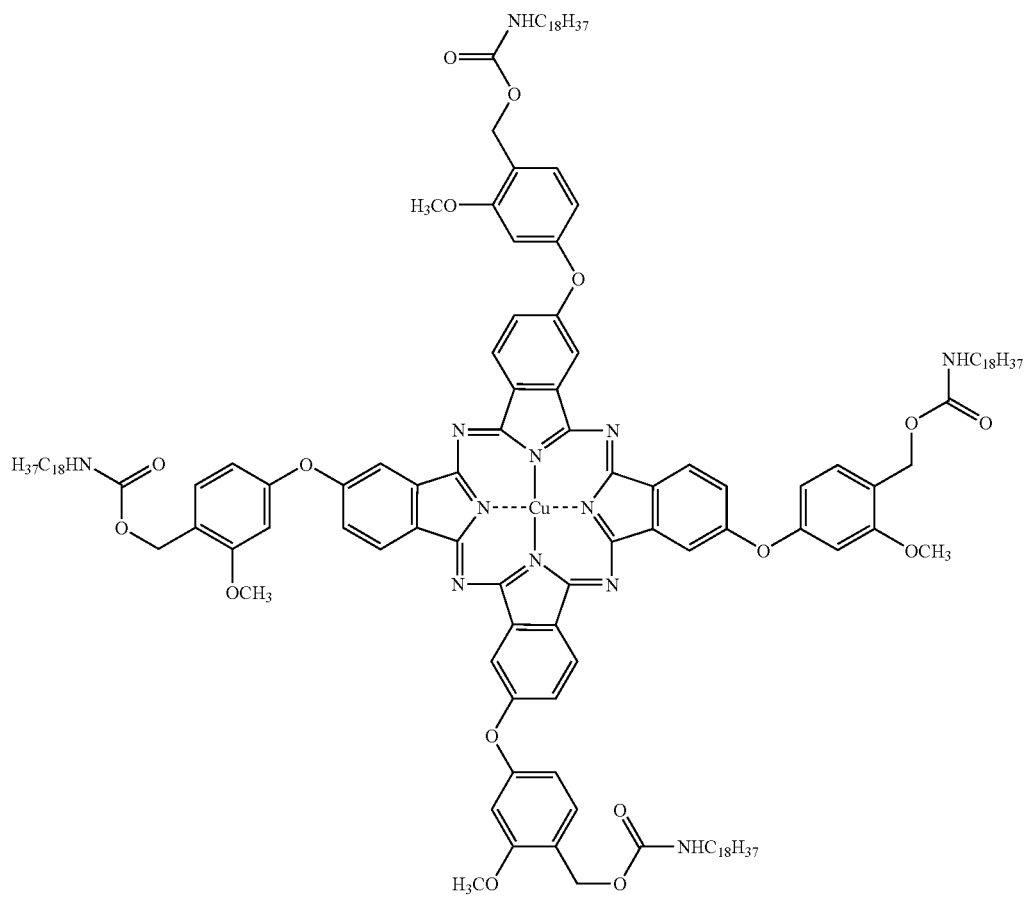

To a 500 milliliter one-neck round bottom flask equipped with magnetic stir bar, condenser, and silicone oil bath was charged 11.0 grams of the tetra(p-(hydroxymethyl)-m-methoxy phenoxy) phthalocyanine prepared in Example VII, 11.0 grams of octadecyl isocyanate, 1 drop of dibutyltindilaurate as a catalyst, and 150 grams of dry N-methyl pyrrolidinone. The contents were heated to 150° C. for about 3 hours until IR spectra of the contents showed no absorbance corresponding to NCO peak at about 2230 cm$^{-1}$, cooled, filtered, and washed with methanol. A waxy cyan colored solid dye was obtained.

EXAMPLE X

Tetrastearyl Carbonate
(p-Hydroxymethy-m-Methoxy Phenoxy)-Substituted
Copper Phthalocyanine

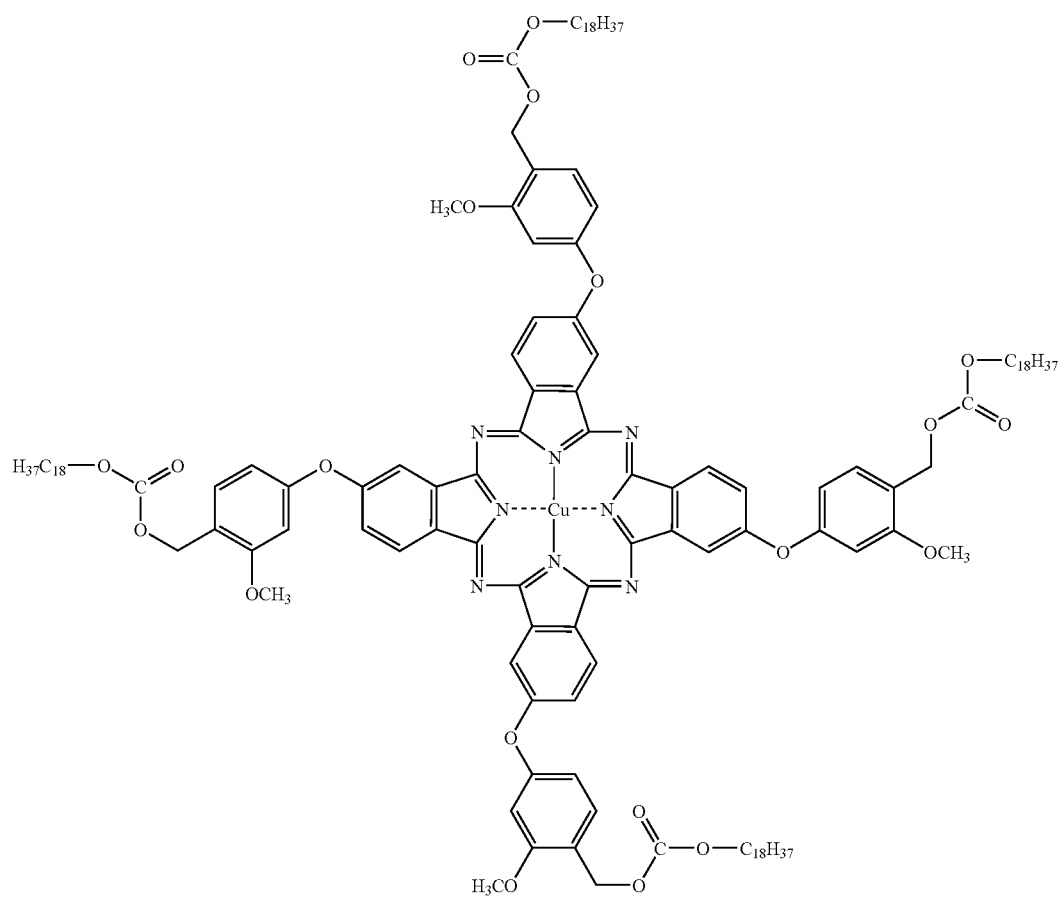

To a 200 milliliter one-necked round bottom flask equipped with magnetic stir bar, condenser, $N_2$ blanket, and silicone oil bath is charged 10.0 grams of tetra(p-(hydroxymethyl)-m-methoxy phenoxy) phthalocyanine as prepared in Example VII, 1.2 grams of $K_2CO_3$, and 150 grams of N-methyl pyrrolidinone. The contents are heated to 120° C. After about 1 hour at this temperature, 11.2 grams of stearyl chloroformate is slowly added over about 30 minutes and post-stirred/heated for about 24 hours. Thereafter, the reaction mixture is cooled and the product is filtered and washed with methanol. It is believed that a waxy, cyan colored solid dye will be obtained.

EXAMPLE XI

Tetra (p-amino-Phenoxy)-Substituted Copper Phthalocyanine

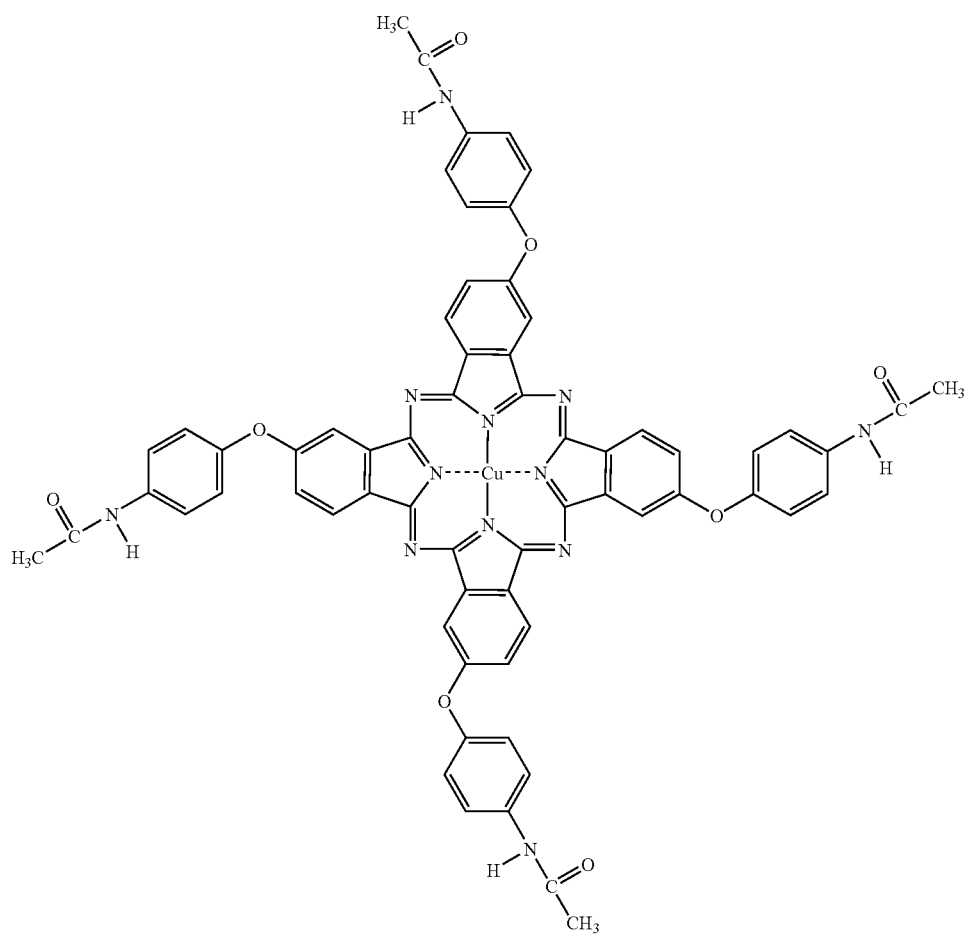

To a 200 milliliter one-necked round bottom flask equipped with magnetic stir bar, condenser, and silicone oil bath is charged 10.0 grams of p-amino-phenoxy phthalonitrile as prepared in Example V, 3.0 grams of ammonia acetate, 1.6 grams of copper acetate (MW=181), and 100 grams of N-methyl pyrrolidinone (NMP). The round bottom flask is placed in a 120° C. oil bath with stirring. After about 1 hour, the temperature of the oil bath is raised to 180° C. After being stirred at 180° C. for three hours, the reaction mixture is poured into 300 grams of deionized water to precipitate the product. The resulting cyan colored product is filtered and dried.

EXAMPLE XII

Tetra-(p-stearylurea-Phenoxy)-Substituted Copper Phthalocyanine

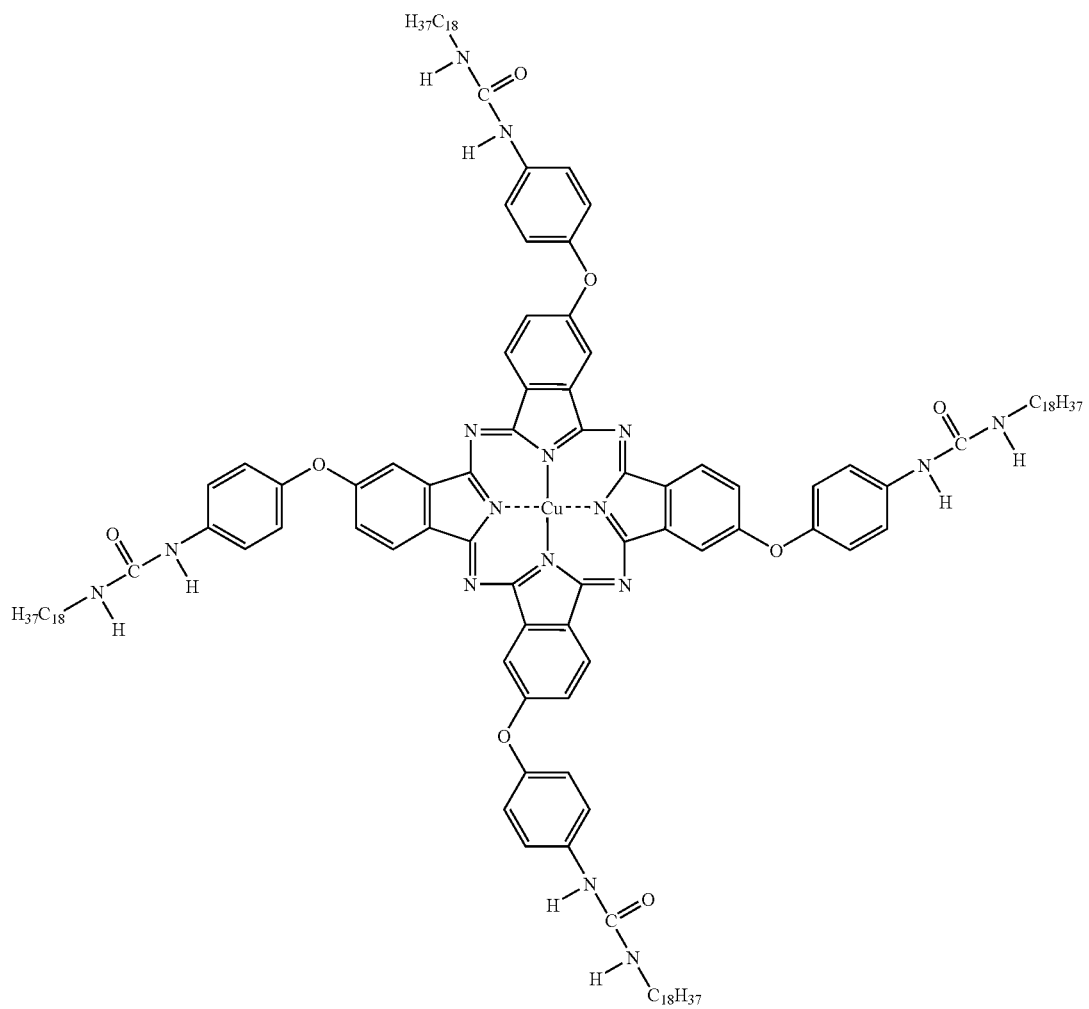

To a 250 milliliter 1-necked round bottom flask equipped with magnetic stirrer and condenser is added 10 grams of the phthalocyanine dye product prepared in Example XI, 100 milliliters of isopropanol, and 1.0 grams of KOH. The contents are stirred while refluxing. After about 14 hours at this temperature, the reaction flask is allowed to come to room temperature with stirring and the contents filtered with vacuum filtration. The cyan product (tetra-(p-amino phenoxy) phthalocyanine) is washed with 50 milliliters of isopropanol several times, allowed to dry, and collected for further use.

To a 100 milliliter one-necked round bottom flask equipped with magnetic stir bar, condenser, and silicone oil bath is charged 5.0 grams of the tetra-(p-amino phenoxy) phthalocyanine thus prepared, 5.9 grams of octadecyl isocyanate, and 50 grams of dry N-methyl pyrrolidinone. The contents are heated to 150° C. for about 3 hours (until IR spectra of the contents show no absorbance corresponding to NCO peak at about 2230 cm$^{-1}$), cooled, filtered, and washed with methanol. It is believed that a waxy cyan colored solid dye will be obtained.

EXAMPLE XIII

Tetra-(p-stearylamide-Phenoxy)-Substituted Copper Phthalocyanine

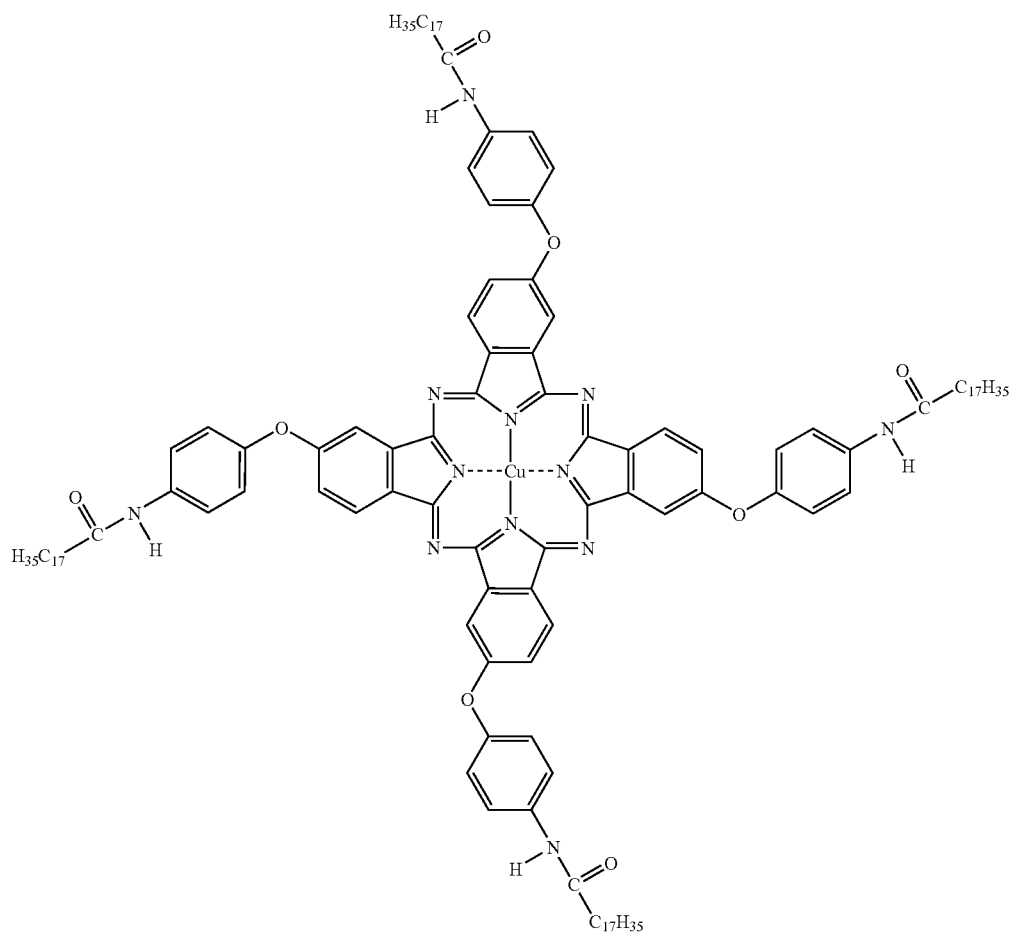

To a 200 milliliter one-necked round bottom flask equipped with magnetic stir bar, condenser, and silicone oil bath is charged 5.0 grams of tetra-(p-amino phenoxy) phthalocyanine (prepared as described in step 1 of Example XII), 5.7 grams of octadecanoic acid, a spatula tip full of p-toluene sulfonic acid, and 120 milliliters of toluene. The reaction mixture is brought to reflux temperature. After 2 days, the reaction vessel is allowed to cool and poured into a 1,000 milliliter beaker with 300 milliliters of methanol to precipitate the product. The product is filtered, washed with methanol several times, and collected, yielding a waxy cyan dye.

EXAMPLE XIV

Tetra-(p-Carboxy Phenoxy)-Substituted Copper Phthalocyanine

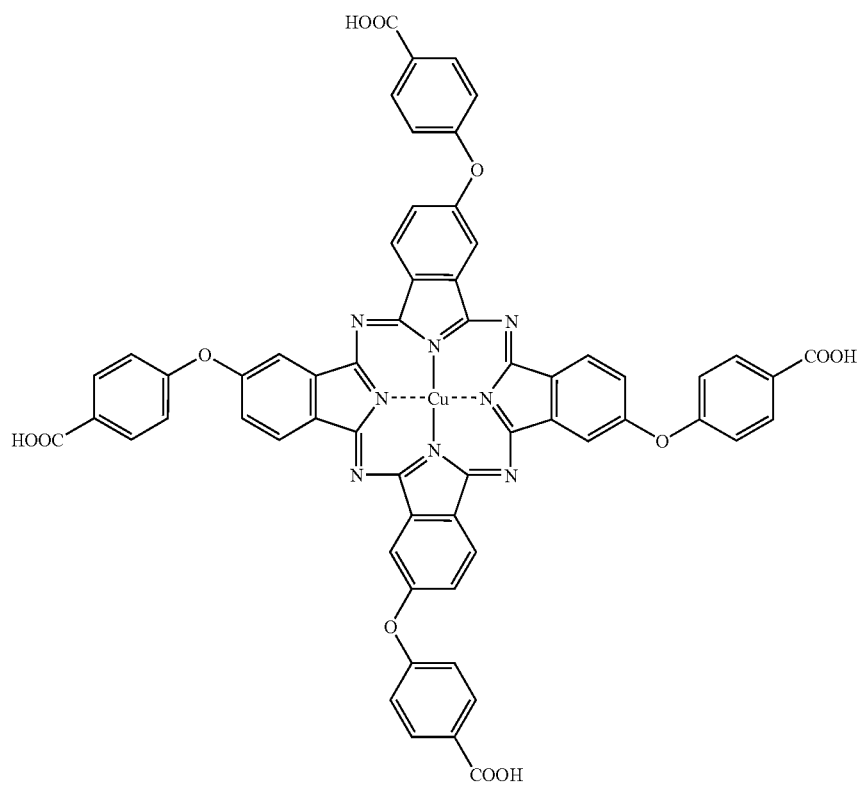

To a 500 milliliter one-necked round bottom flask equipped with magnetic stir bar, condenser, and silicone oil bath is charged 26.4 grams of 4-(p-carboxy phenoxy) phthalonitrile as prepared in Example XIII (MW=264), 9.2 grams of ammonia acetate (MW=77), 4.5 grams of copper acetate (MW=181), and 200 grams of N-methyl pyrrolidinone (NMP). The round bottom flask is placed in a 120° C. oil bath with stirring. The temperature of the oil bath is then raised to 180° C. After being stirred at 180° C. for three hours, the reaction mixture is poured into 300 grams of deionized water. The precipitated product is filtered and dried.

EXAMPLE XV

Tetra-(p-stearylester-Phenoxy)-Substituted Copper Phthalocyanine

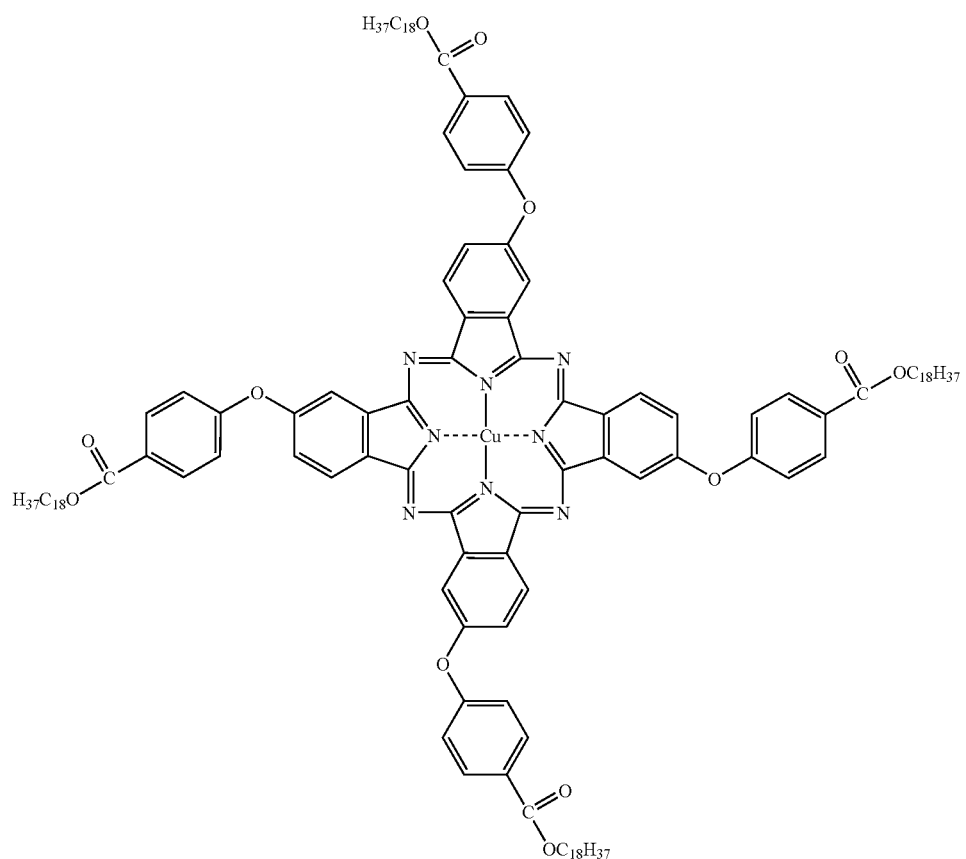

To a 200 milliliter one-necked round bottom flask equipped with magnetic stir bar, condenser, and silicone oil bath is charged 10.0 grams of tetra-(p-carboxy phenoxy) phthalocyanine prepared as described in Example XIV, 9.7 grams of octadecanol, a spatula tip full of p-toluene sulfonic acid, and 120 milliliters of toluene. The reaction mixture is brought to reflux. After 2 days, the reaction vessel is allowed to cool and is poured into a 1,000 milliliter beaker with 300 milliliters of methanol to precipitate the product. The product is filtered, washed with methanol several times, and collected.

EXAMPLE XVI

Tetra-(p-stearylamide-Phenoxy)-Substituted Copper Phthalocyanine

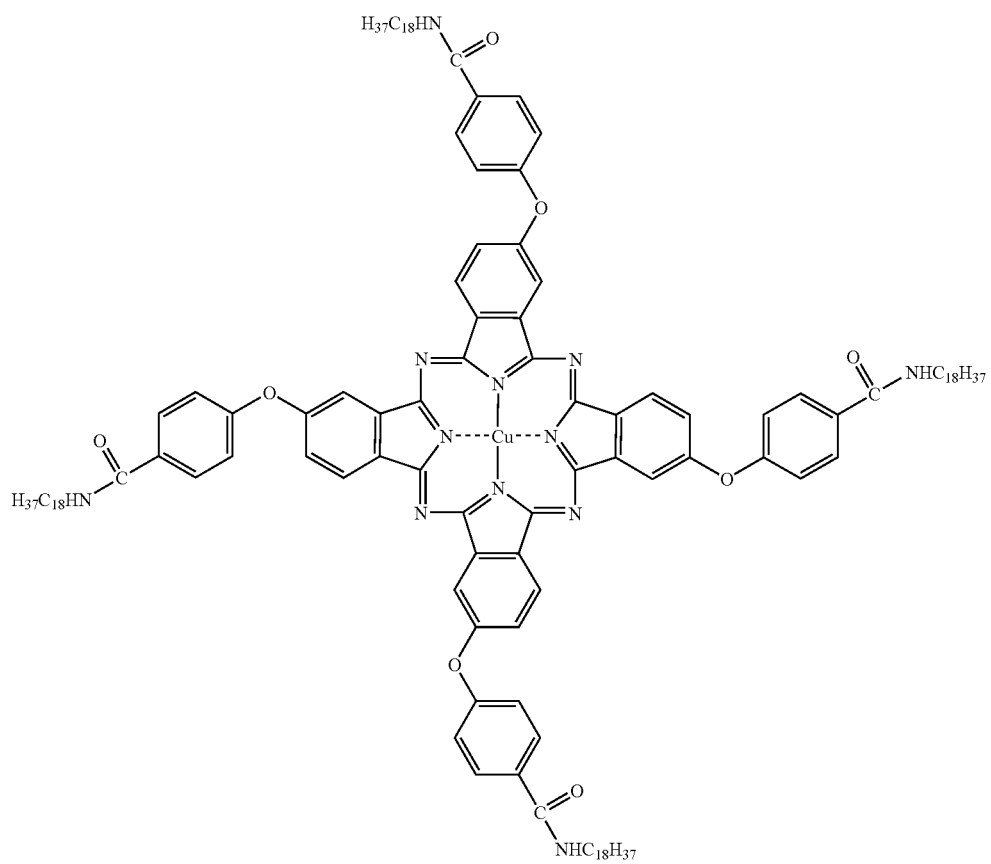

To a 200 milliliter one-necked round bottom flask equipped with magnetic stir bar, condenser, and silicone oil bath is charged 10.0 grams of tetra-(p-carboxy phenoxy) phthalocyanine prepared as described in Example XIV, 9.7 grams of octadecyl amine, and 120 milliliters of toluene. The reaction mixture is brought to reflux. After 2 hours, the toluene is distilled off. The reaction product is then heated to 190° C. with stirring and held at that temperature for 3 hours under a nitrogen atmosphere. The contents of the reaction vessel are then poured into an aluminum mold and allowed to cool.

EXAMPLE XVII

(p-Hydroxymethy-m-Methoxy Phenoxy)-Substituted Zinc Phthalocyanine

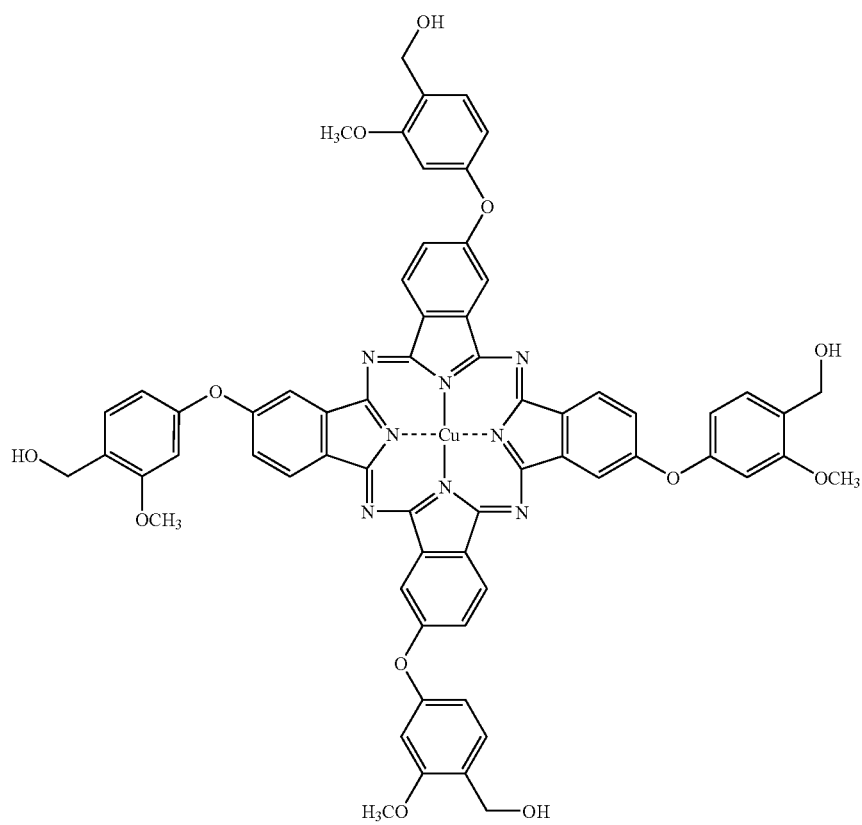

To a 200 milliliter one-necked round bottom flask equipped with magnetic stir bar, condenser, and silicone oil bath is charged 16.8 grams of p-(hydroxymethyl)-m-methoxy phenoxy phthalonitrile prepared as described in Example I (6.20 grams, 0.022 mole), zinc acetate dihydrate (1.10 gram, 0.0050 mole, obtained from Aldrich Chemical Co.), and DMAE (5 milliliters) in NMP (45 milliliters). The reaction mixture is stirred and heated to 175° C. The resultant deep blue-green solution is heated at 175° C. for 3 hours and then cooled to room temperature. Methanol is then added to the solution to precipitate the solid product, which is separated by decantation. The solid is washed in the flask with 2×25 milliliter portions of acetone and then dried.

EXAMPLE XVIII (p-Hydroxymethy-m-Methoxy Phenoxy)-Substituted Nickel Phthalocyanine

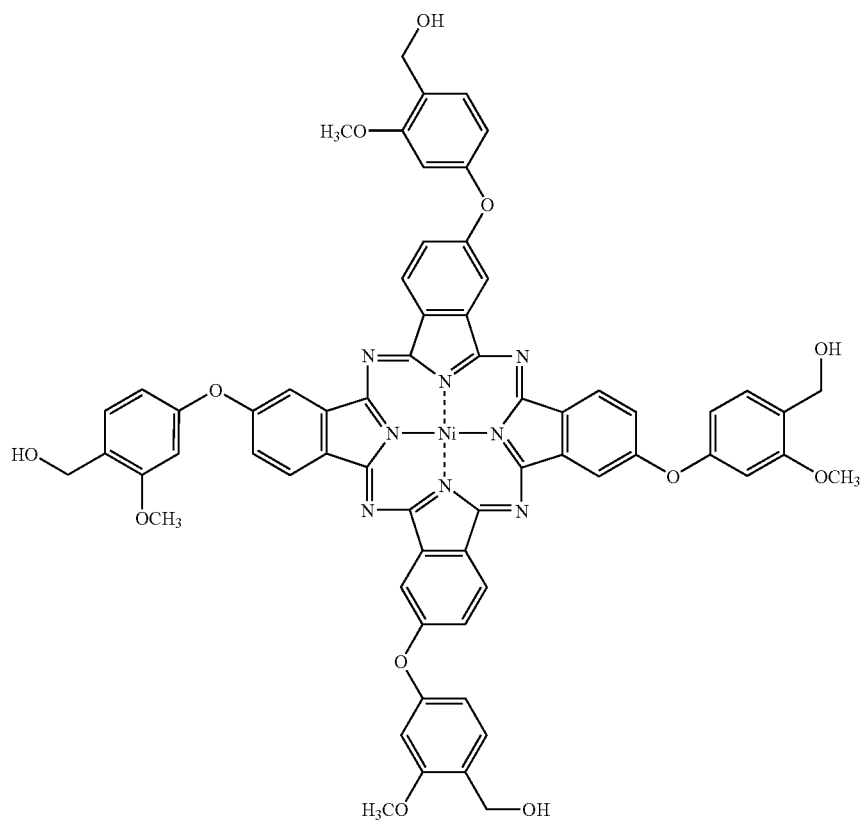

To a 200 milliliter one-necked round bottom flask equipped with magnetic stir bar, condenser, and silicone oil bath is charged 30.6 grams of p-(hydroxymethyl)-m-methoxy phenoxy phthalonitrile prepared as described in Example I (0.11 mole). In 200 milliliters of NMP is added nickel(II) acetate tetrahydrate (6.22 grams, 0.025 mole) and ammonium acetate (7.7 grams, 0.10 mole). The mixture is stirred and heated at 120° C. for 20 minutes, followed by heating at 170° C. for 2 hours. The mixture is cooled to 100° C., followed by filtration and washing of the solid product in the filtration funnel with 3×50 milliliter portions of DMF. The product is then slurried in 200 milliliters of acetone for 14 hours, followed by separation by decantation.

EXAMPLE XIX

Intermediates

The processes of Examples I through VI are repeated except that 3-nitrophthalonitrile is substituted for 4-nitrophthalonitrile. It is believed that similar results will be obtained, yielding the 3-substituted phthalonitrile products instead of the 4-substituted phthalonitrile products.

EXAMPLE XX

The processes of Examples VII through XVIII are repeated except that the 3-substituted phthalonitrile intermediates prepared in Example XVII are used. It is believed that similar results will be obtained, yielding the 1,4-substituted phthalocyanine products instead of the 2,3-substituted phthalocyanine products.

INK EXAMPLE 1

An ink base was prepared by melting, admixing, and filtering the following ingredients: (a) polyethylene wax (PE 655, obtained from Baker Petrolite, Tulsa, Okla., of the formula $CH_3(CH_2)_{50}CH_3$), 43.59 parts by weight; (b) stearyl stearamide wax (KEMAMIDE® S-180, obtained from Crompton Corporation, Greenwich, Conn.), 19.08 parts by weight; (c) tetra-amide resin obtained from the reaction of one equivalent of a C-36 dimer acid (obtained from Uniqema, New Castle, Del.) with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 18.94 parts by weight; (d) urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 11.71 parts by weight; (e) urethane resin that is the adduct of three equivalents of stearyl isocyanate and a glycerol-based alcohol, prepared as described in Example 4 of U.S. Pat. No. 6,309,453, the disclosure of which is totally incorporated herein by reference, 6.48 parts by weight; and (f) NAUGUARD® 445 antioxidant (obtained from Uniroyal Chemical Co., Middlebury, Conn.), 0.20 parts by weight.

600 grams of the ink carrier components listed above in the percentages listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER AID, obtained from Fluka Chemika, Switzerland, and proceeded at a temperature of 135° C. until complete after 6 hours. The ink base was poured into molds containing about 31 grams of the colorless ink base and allowed to cool.

INK EXAMPLE 2

About 29.8 grams of colorless ink base from Ink Example 1 was placed in a 100 milliliter beaker with a magnetic stir bar and subsequently placed in a 135° C. oil bath until molten. Thereafter, 3.4 grams of the colorant from Example IX was added and stirred for about 3 hours. The cyan colored ink was then poured into an aluminum mold.

INK EXAMPLE 3

Using a RK Print-Coat Instruments Ltd. K-proofer, print samples of the ink from Ink Example 2 were produced on HAMMERMILL LASERPRINT® paper. These proofs showed three different intensities of ink coverage on the paper.

INK EXAMPLE 4

The procedures of Ink Examples 1 through 3 are repeated with the inks of Examples VII, VIII, X through XVIII, and XX. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A compound of the formula

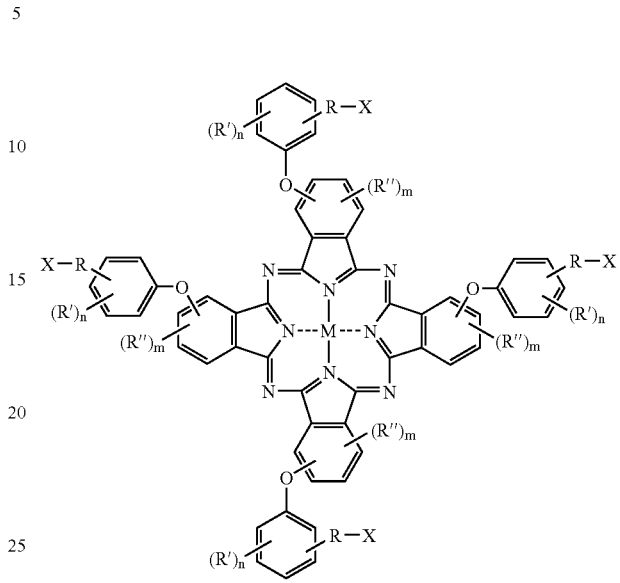

wherein M is an atom or group of atoms capable of bonding to the central cavity of a phthalocyanine molecule, wherein axial ligands optionally can be attached to M, each R' and R", independently of the others, is a substituent selected from the group consisting of an alkyl group, an aryl group, an aralkyl group, an alkylaryl group, a nitrile group, a nitro group and an alkoxy group, each n, independently of the others, is 0, 1, 2, 3, or 4, each m, independently of the others, is 0, 1, 2, or 3, each R, independently of the others, is an alkylene group, an arylene group, an arylalkylene group, or an alkylarylene group, each X, independently of the others, is —OH, —COOH, or a group of the formula

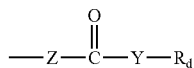

wherein each Y and each Z, independently of the others, is a direct bond, an oxygen atom, or a group of the formula —NR$_1$—, wherein R$_1$ is a hydrogen atom, an alkyl group, an aryl group, or an arylalkyl group, or an alkylaryl group, provided that Z and Y are not both direct bonds connected to a single C=O moiety at the same time, provided that when X is

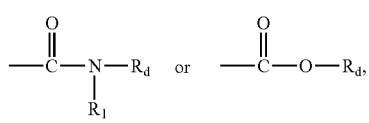

R can also be a direct bond, and each $R_d$, independently of the others, is an alkyl group, an aryl group, an arylalkyl group, or an alkylaryl group, and provided that when X is —OH or —COOH, each n is independently 1, 2, 3 or 4.

2. A compound according to claim 1 wherein X is —OH.

3. A compound according to claim 1 wherein X is —COOH.

4. A compound according to claim 1 wherein X is a group of the formula

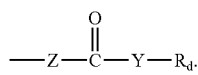

5. A compound according to claim 4 wherein X is

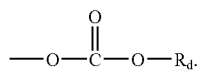

6. A compound according to claim 4 wherein X is

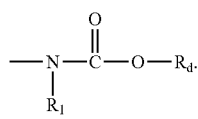

7. A compound according to claim 4 wherein X is

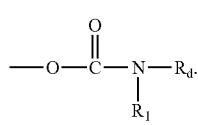

8. A compound according to claim 4 wherein X is

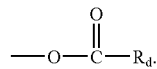

9. A compound according to claim 4 wherein X is

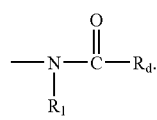

10. A compound according to claim 4 wherein X is

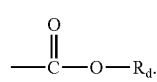

11. A compound according to claim 4 wherein X is

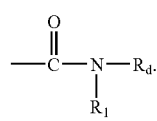

12. A compound according to claim 11 wherein R is a direct bond.

13. A compound according to claim 1 wherein m is 0.

14. A compound according to claim 1 wherein n is 0.

15. A compound according to claim 1 wherein n and m are both 0.

16. A compound according to claim 1 wherein M is copper.

17. A compound according to claim 1 wherein R is an alkylene group.

18. A compound according to claim 1 wherein $R_d$ is an alkyl group.

19. A compound according to claim 18 wherein $R_d$ is an alkyl group having at least about 18 carbon atoms.

20. A compound according to claim 1 which is derived from 4-nitrophthalonitrile.

21. A compound according to claim 1 which is derived from 3-nitrophthalonitrile.

22. A compound chosen from
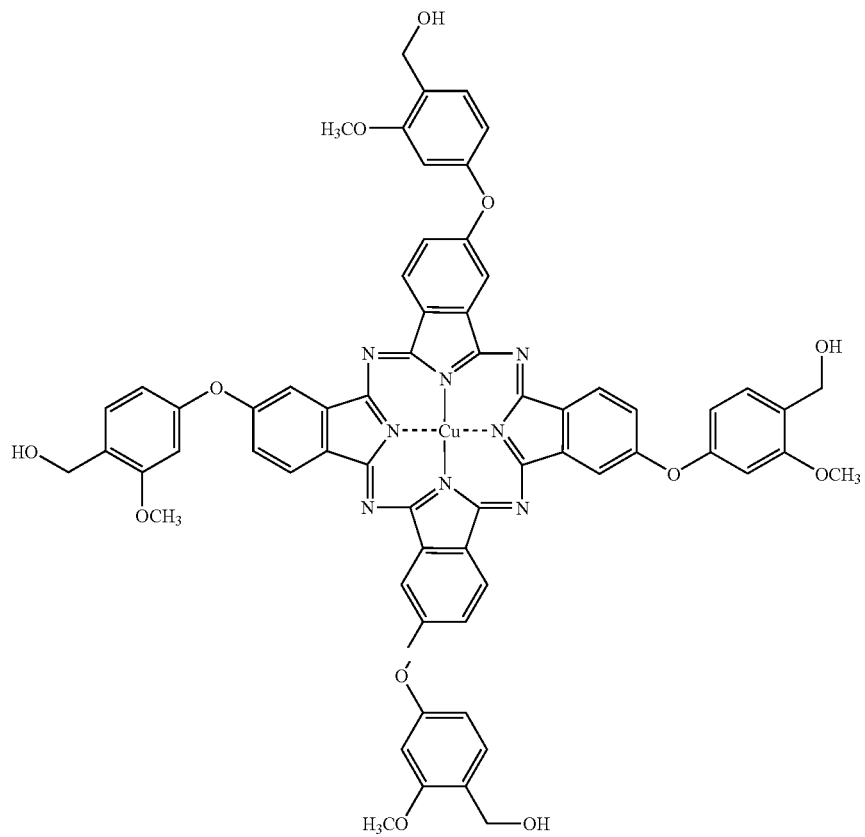
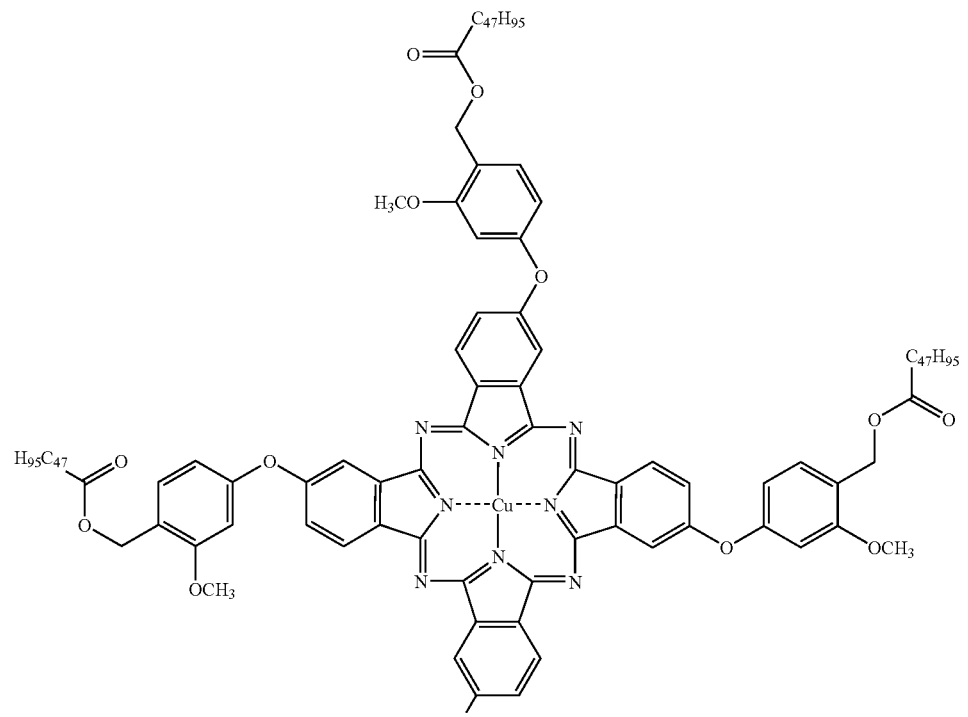

-continued
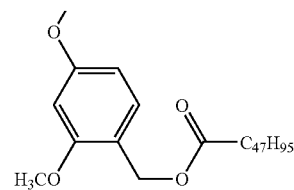
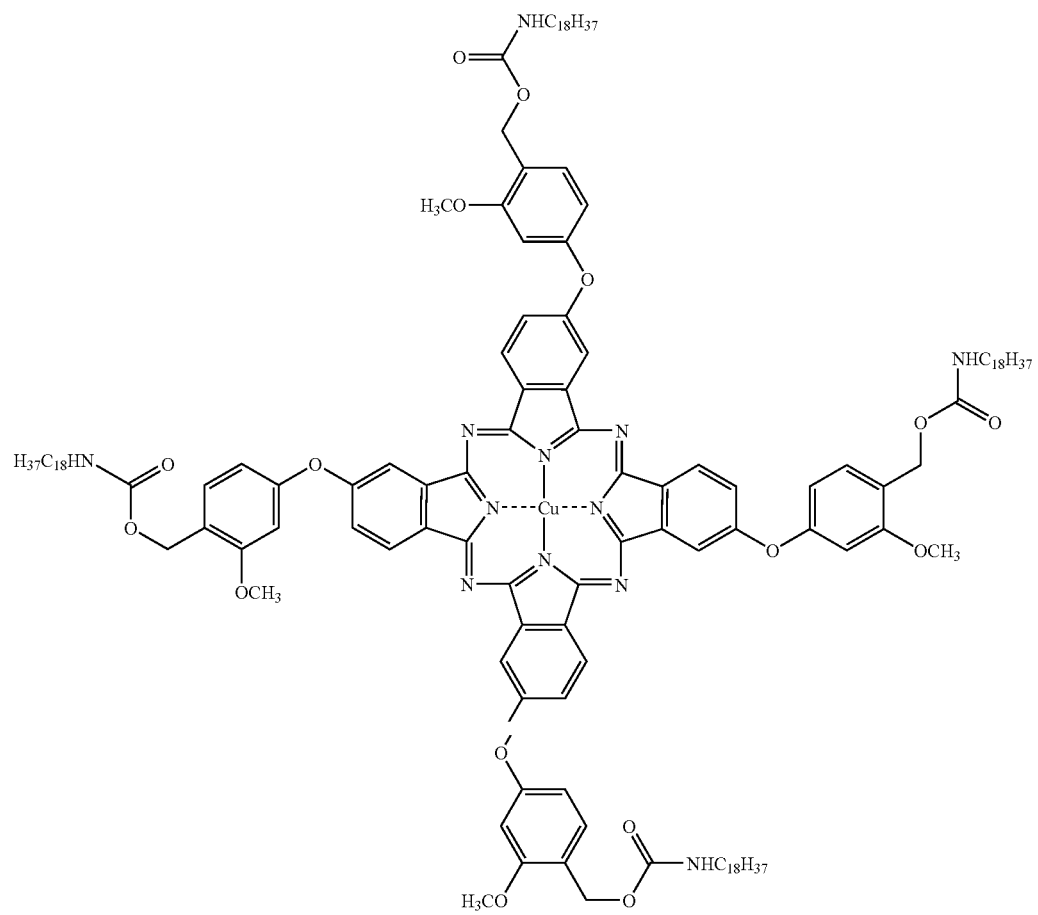

-continued
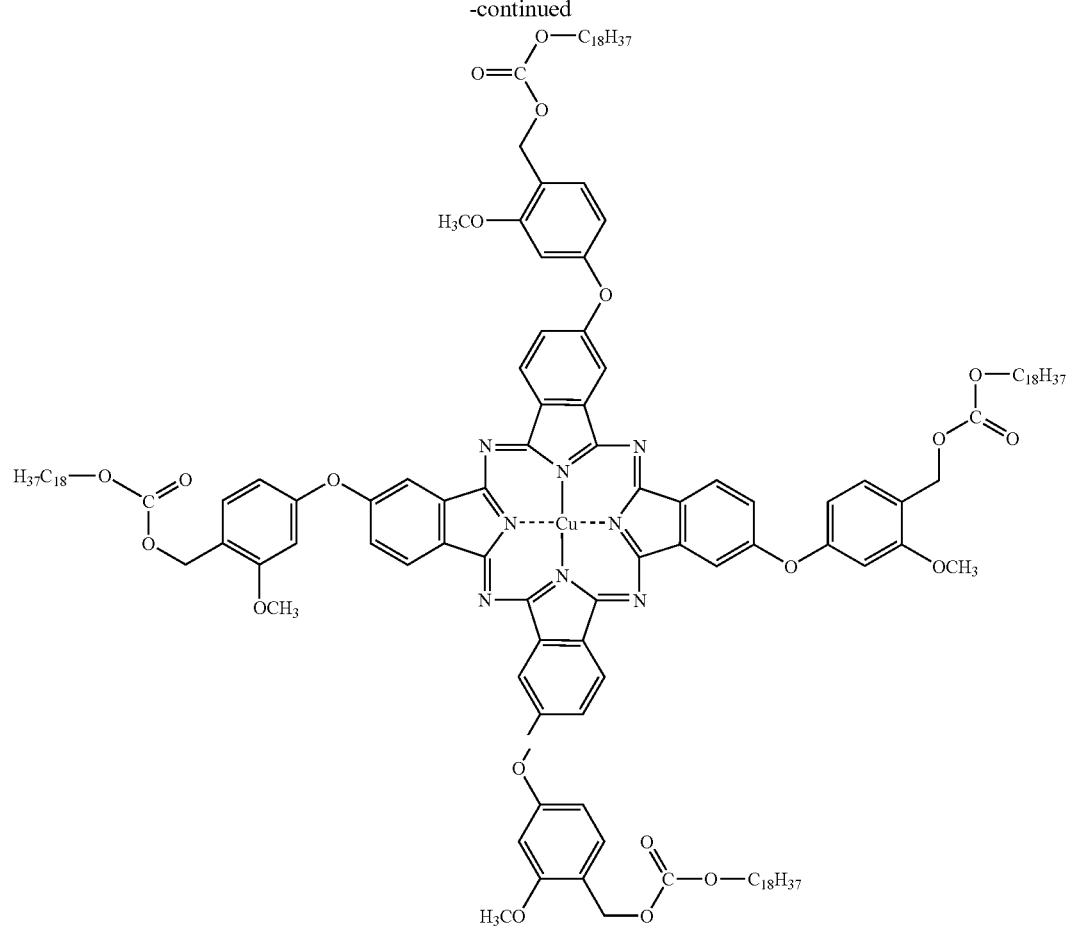
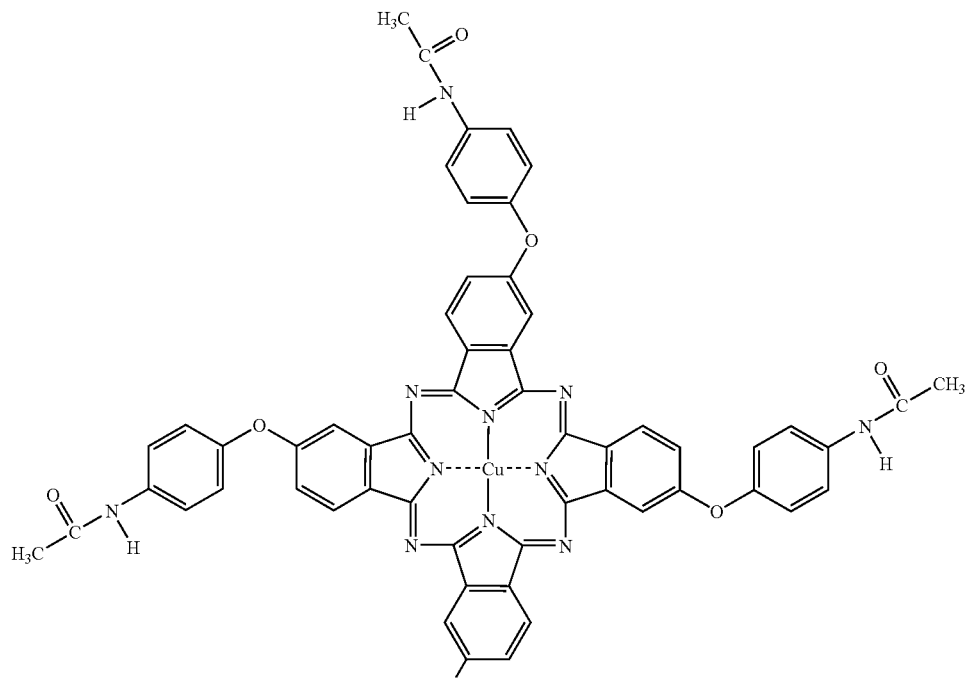

-continued
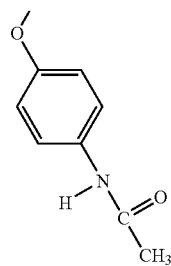
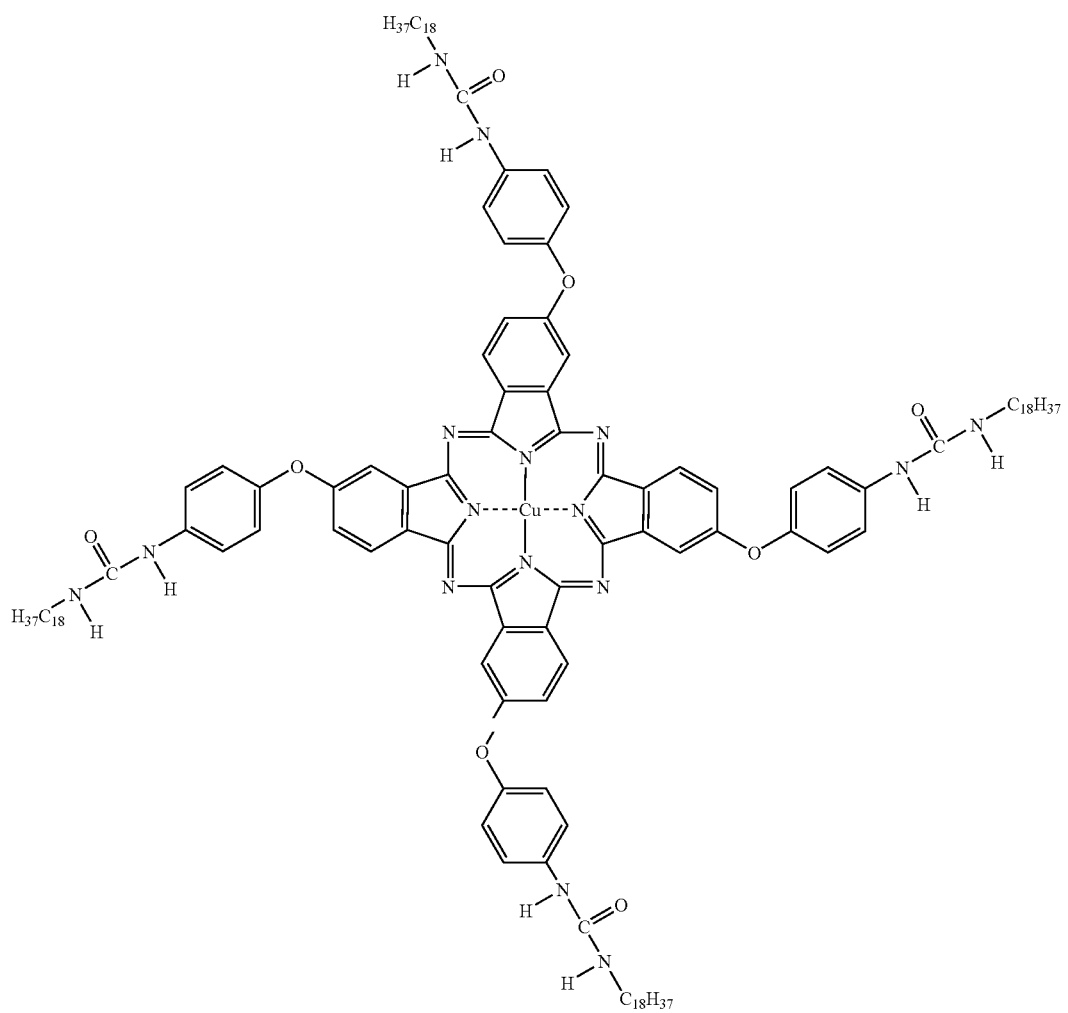

-continued
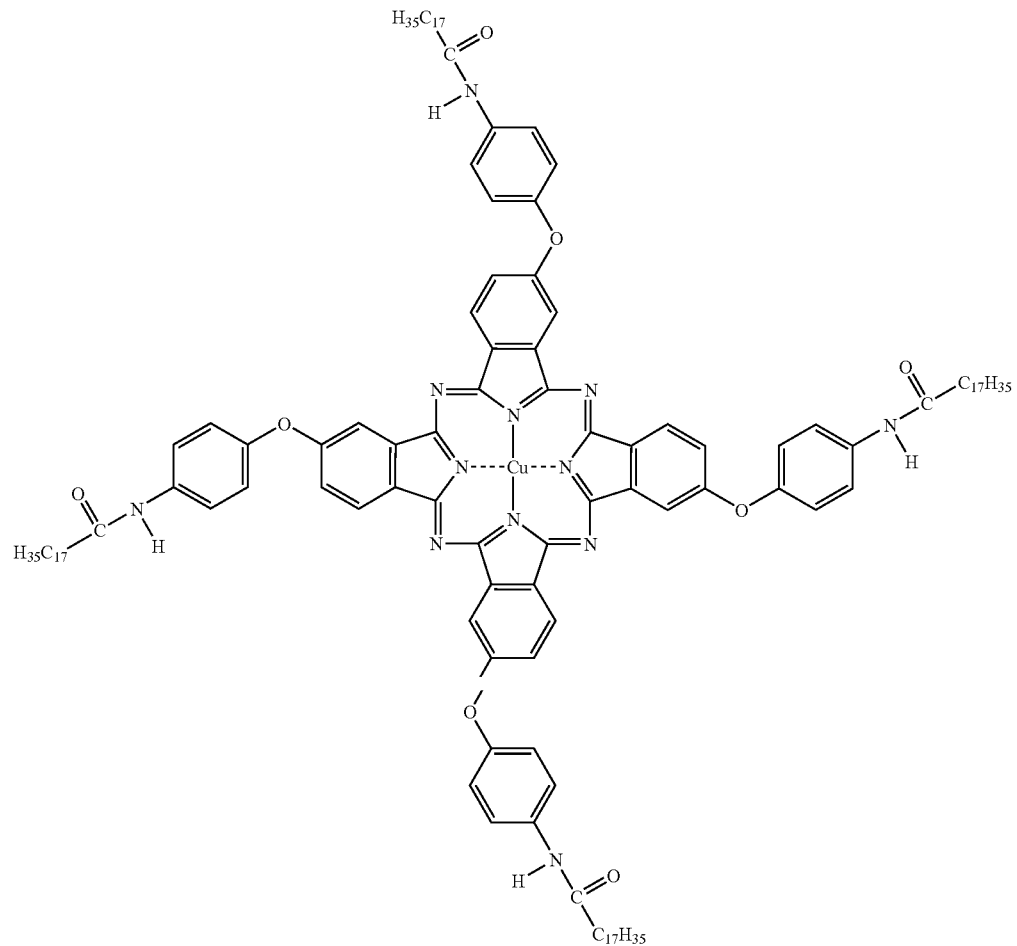
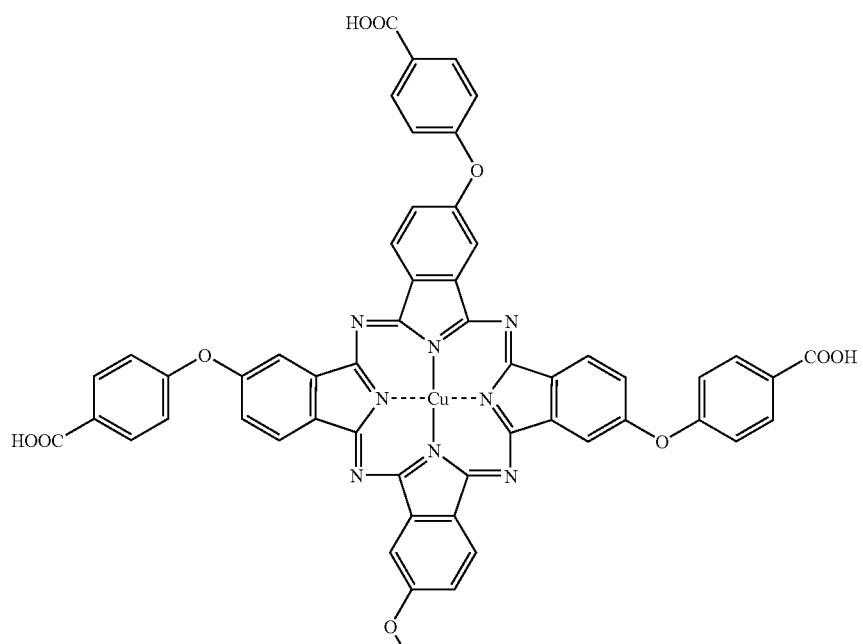

-continued
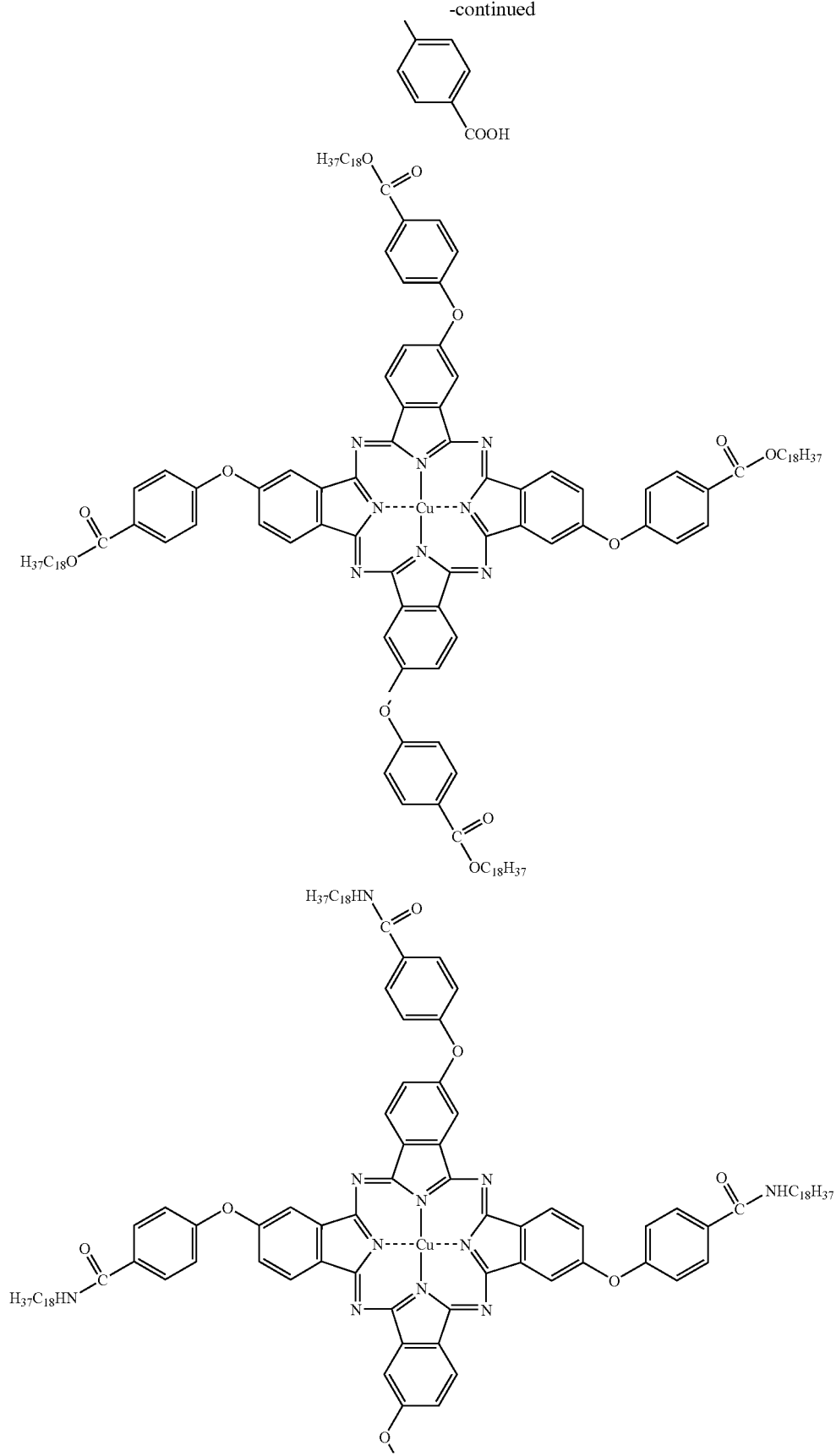

-continued
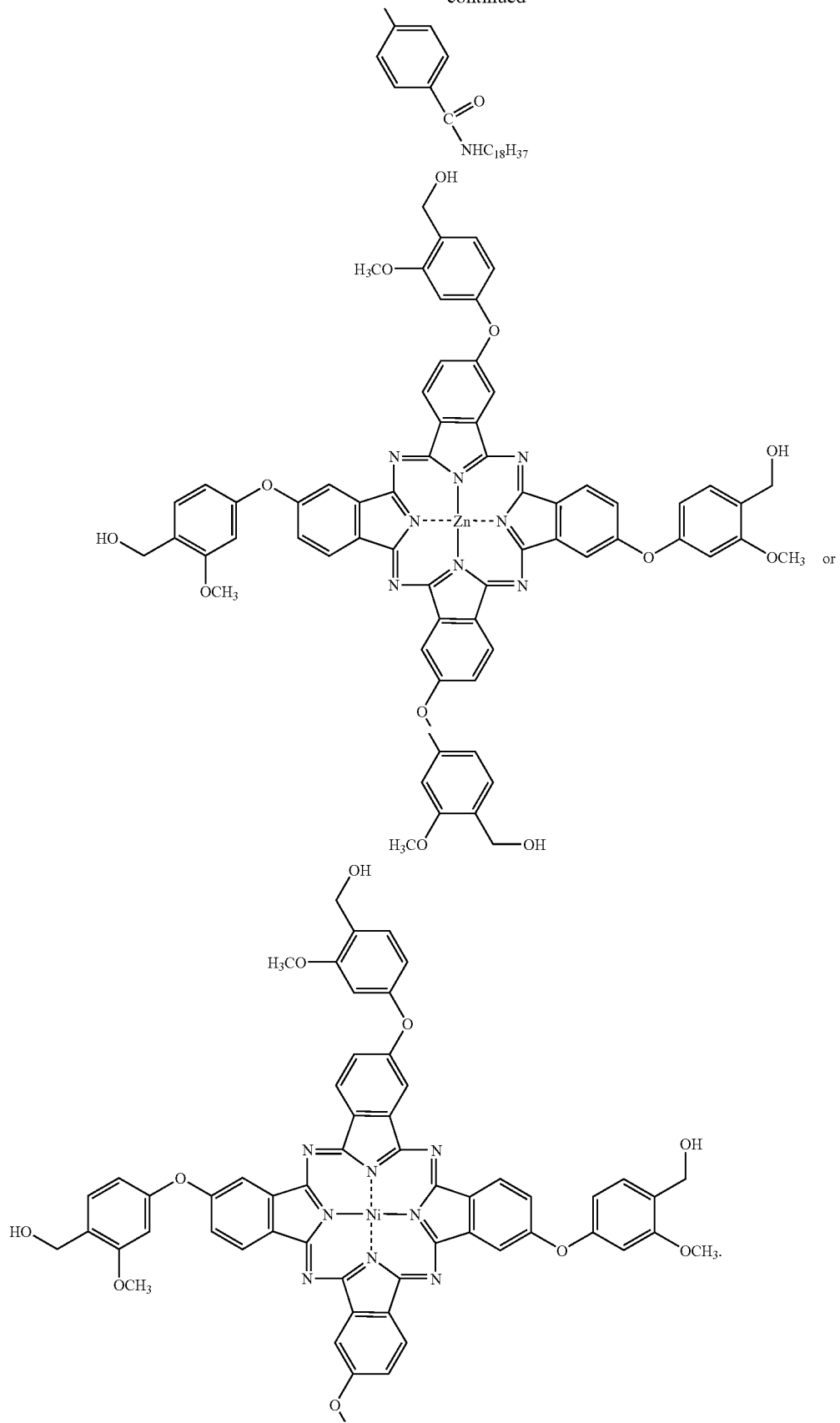

-continued
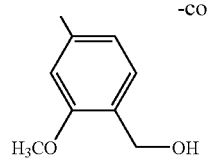
* * * * *